United States Patent
Enoki

(10) Patent No.: US 11,218,658 B2
(45) Date of Patent: Jan. 4, 2022

(54) SOLID-STATE IMAGING DEVICE, METHOD OF CONTROLLING THE SOLID-STATE IMAGING DEVICE, AND ELECTRONIC APPARATUS TO GENERATE HIGH DYNAMIC RANGE IMAGE

(71) Applicant: SONY SEMICONDUCTOR SOLUTIONS CORPORATION, Kanagawa (JP)

(72) Inventor: Koji Enoki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 8 days.

(21) Appl. No.: 16/632,430

(22) PCT Filed: Jul. 6, 2018

(86) PCT No.: PCT/JP2018/025656
§ 371 (c)(1),
(2) Date: Jan. 20, 2020

(87) PCT Pub. No.: WO2019/017217
PCT Pub. Date: Jan. 24, 2019

(65) Prior Publication Data
US 2020/0213549 A1    Jul. 2, 2020

(30) Foreign Application Priority Data

Jul. 21, 2017  (JP) .............................. JP2017-141536

(51) Int. Cl.
*H04N 5/378*    (2011.01)
*H04N 5/355*    (2011.01)
*H04N 5/3745*   (2011.01)

(52) U.S. Cl.
CPC ......... *H04N 5/378* (2013.01); *H04N 5/35527* (2013.01); *H04N 5/37455* (2013.01)

(58) Field of Classification Search
CPC ............... H04N 5/378; H04N 5/35527; H04N 5/37455; H04N 5/3559
See application file for complete search history.

(56) References Cited

U.S. PATENT DOCUMENTS

| 2006/0284051 A1 | 12/2006 | Ko et al. |
| 2014/0327802 A1 | 11/2014 | Mabuchi |
| 2017/0078606 A1* | 3/2017 | Ohmaru ............... H04N 5/3575 |

FOREIGN PATENT DOCUMENTS

| JP | 2000-050151 A | 2/2000 |
| JP | 2007-006478 A | 1/2007 |

(Continued)

OTHER PUBLICATIONS

International Search Report and Written Opinion of PCT Application No. PCT/JP2018/025656, dated Sep. 18, 2018, 10 pages of ISRWO.

*Primary Examiner* — Nicholas G Giles
(74) *Attorney, Agent, or Firm* — Chip Law Group

(57) ABSTRACT

Provided is a solid-state imaging device that includes a high sensitivity floating diffusion (FD) and a low sensitivity FD that hold a charge generated in a photodiode PD of a pixel, an FD coupling transistor that turns on and off coupling of the high sensitivity FD and the low sensitivity FD, and a saturation sensing circuit that performs a control that couples the high sensitivity FD and the low sensitivity FD, when a voltage of a pixel signal outputted from the pixel matches a voltage of a ramp signal. A level of the ramp signal varies in accordance with elapsed time.

18 Claims, 20 Drawing Sheets

(56) References Cited

FOREIGN PATENT DOCUMENTS

| | | |
|---|---|---|
| JP | 2013-216600 A | 10/2013 |
| JP | 2017-055403 A | 3/2017 |
| WO | 2013/111629 A1 | 8/2013 |
| WO | 2017/042658 A1 | 3/2017 |

* cited by examiner

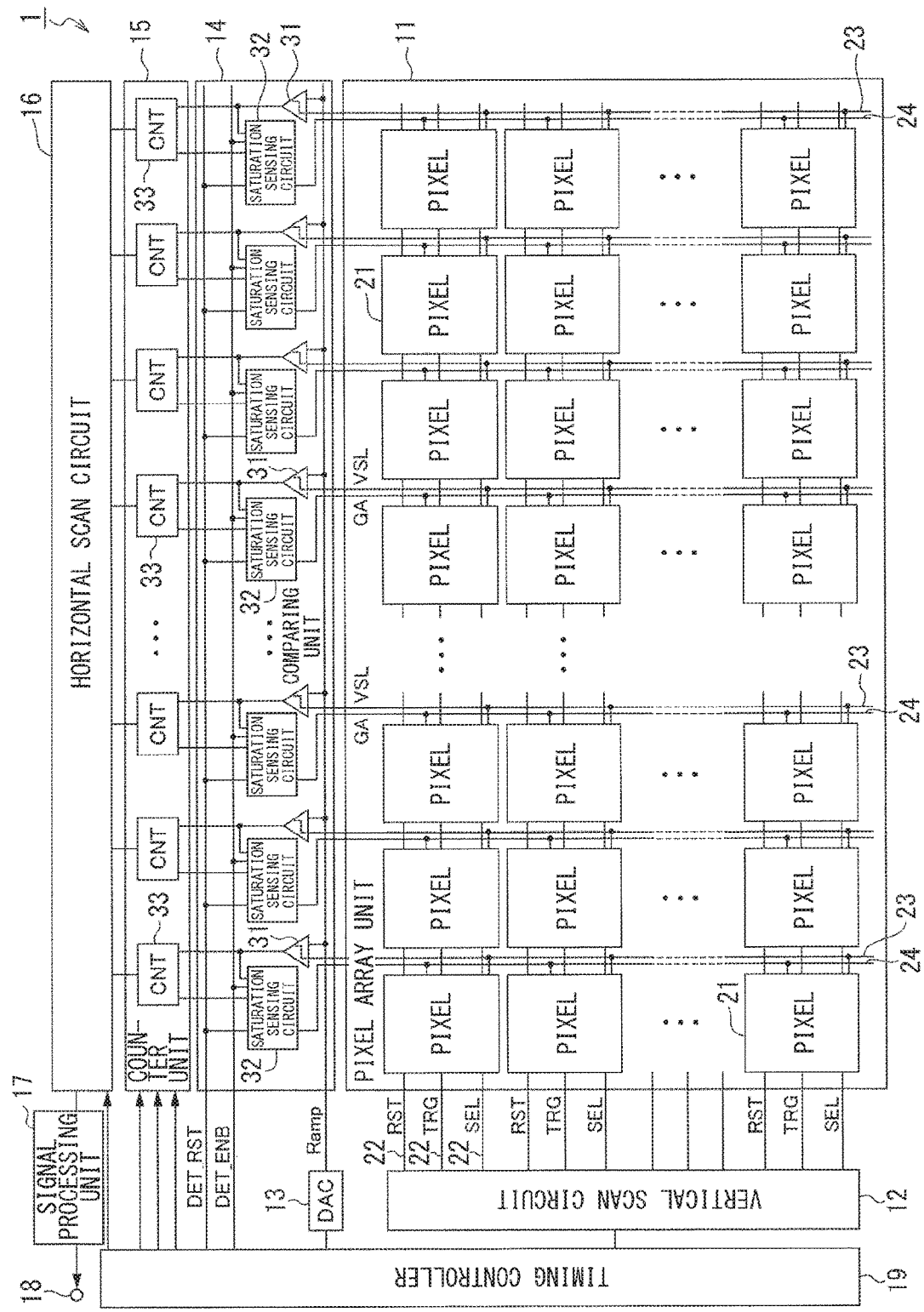
[FIG. 1]

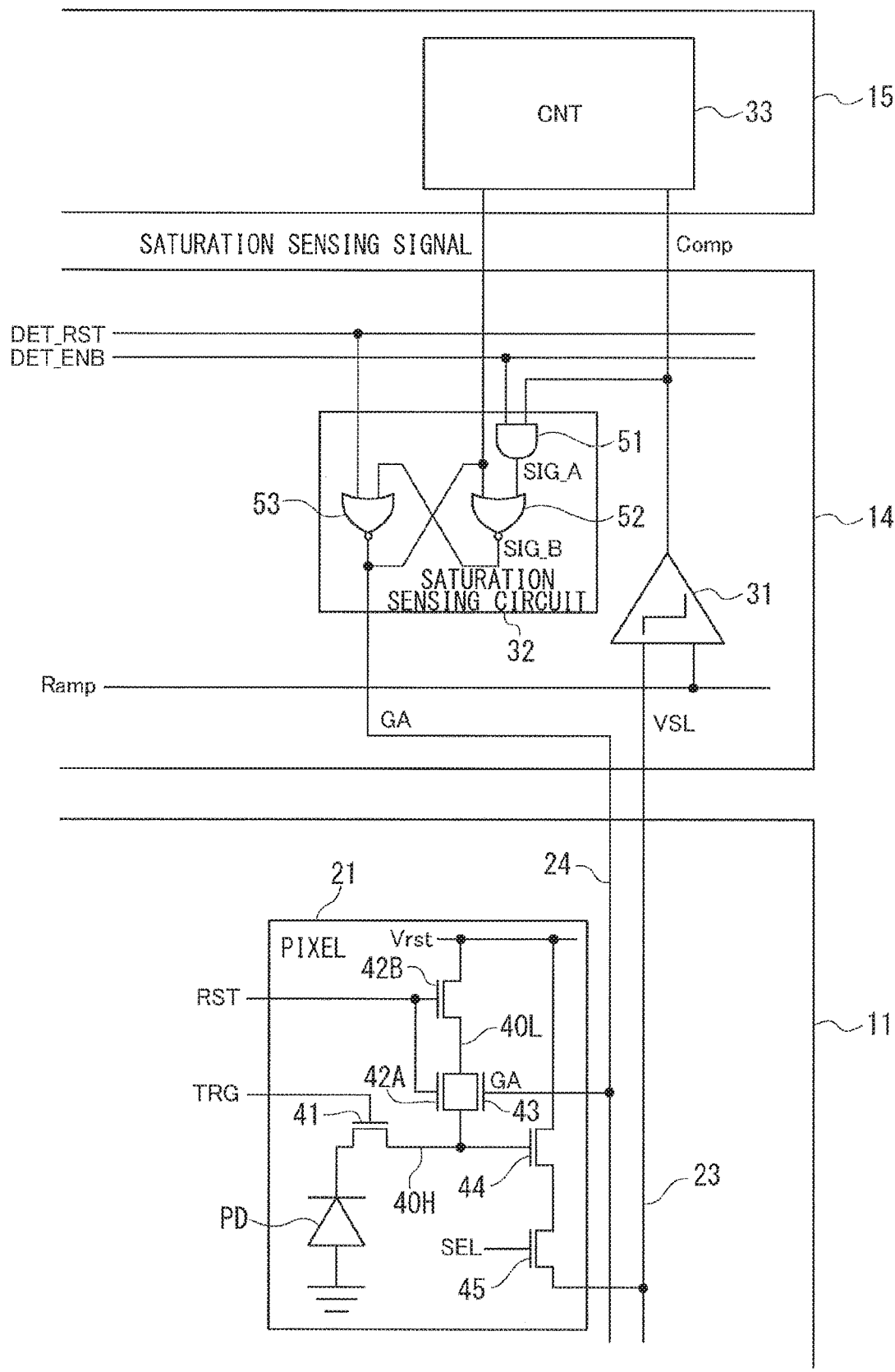
[FIG. 2]

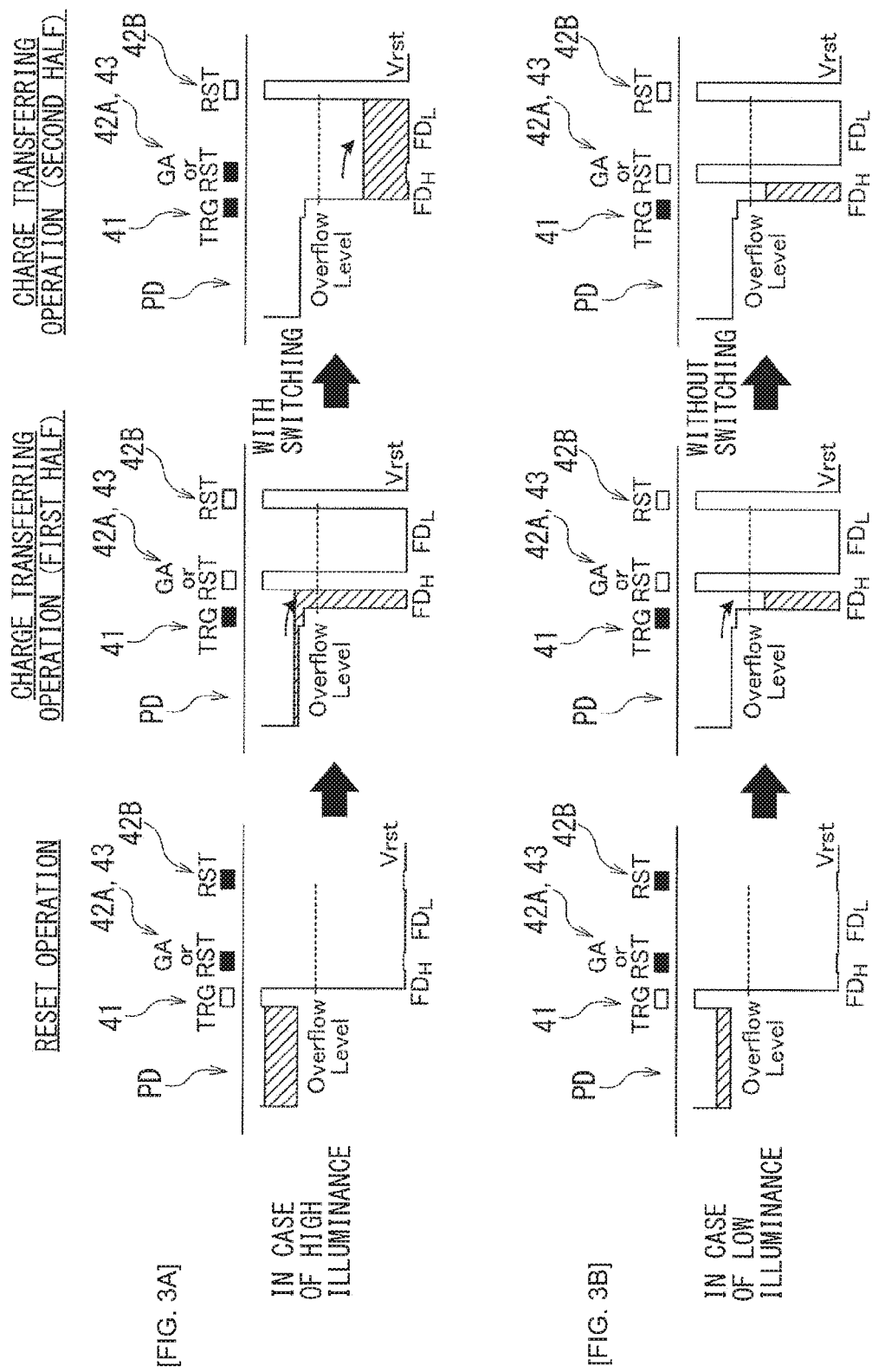

[FIG. 4]
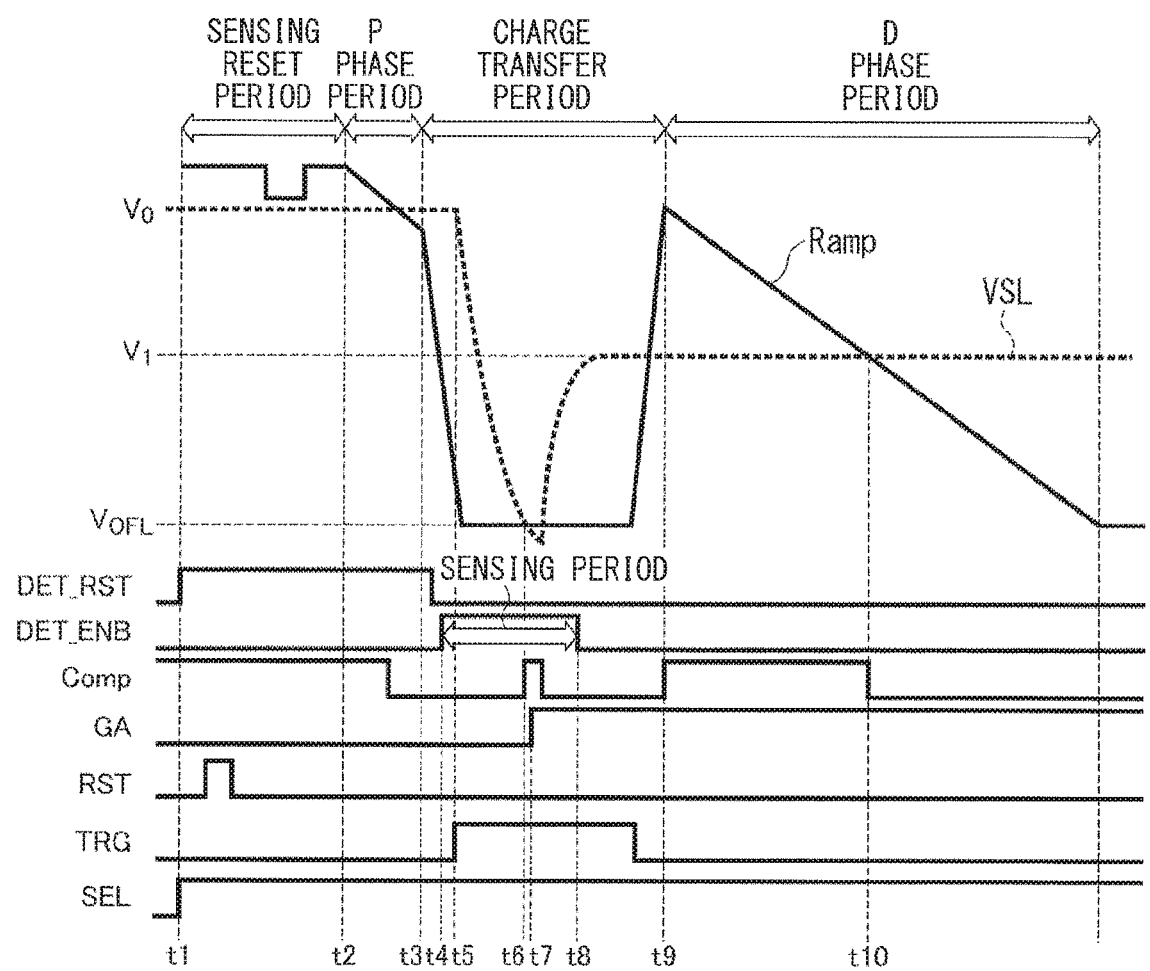

[FIG. 5]

| STATE | DET_RST | DET_ENB | Comp | SIG_A | SIG_B | GA | OPERATION |
|---|---|---|---|---|---|---|---|
| ST_A | 1 | 0 | 1 | 0 | 1 | 0 | RESET SENSING RESULT (GA) |
| ST_B | 0 | 0 | 0 | 0 | HOLD | HOLD | HOLD VALUE |
| ST_C | 0 | 1 | 0 | 0 | HOLD | HOLD | SENSING PERIOD (HOLD VALUE) |
| ST_D | 0 | 1 | 1 | 1 | 0 | 1 | SENSING PERIOD (GA SET) |

[FIG. 6]
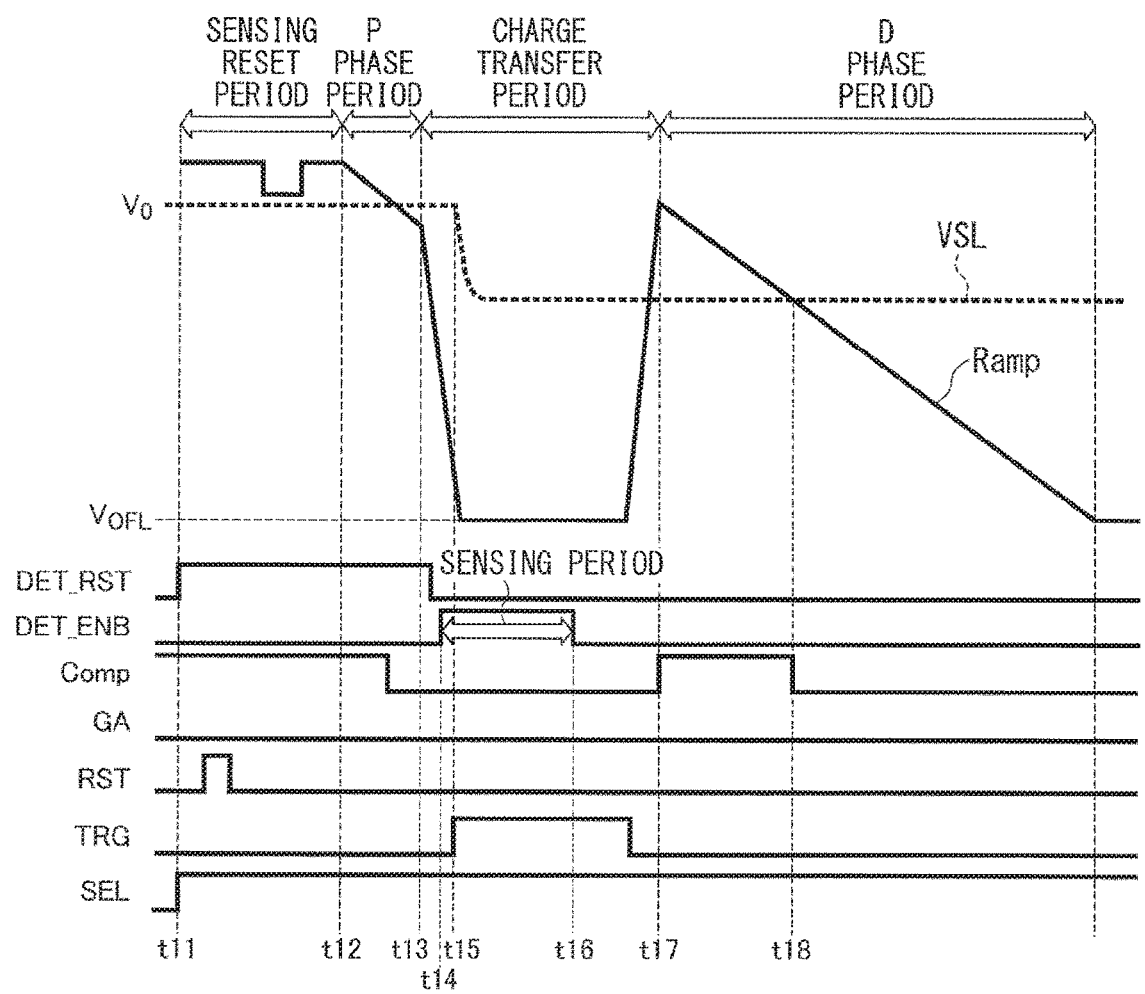

[FIG. 7]
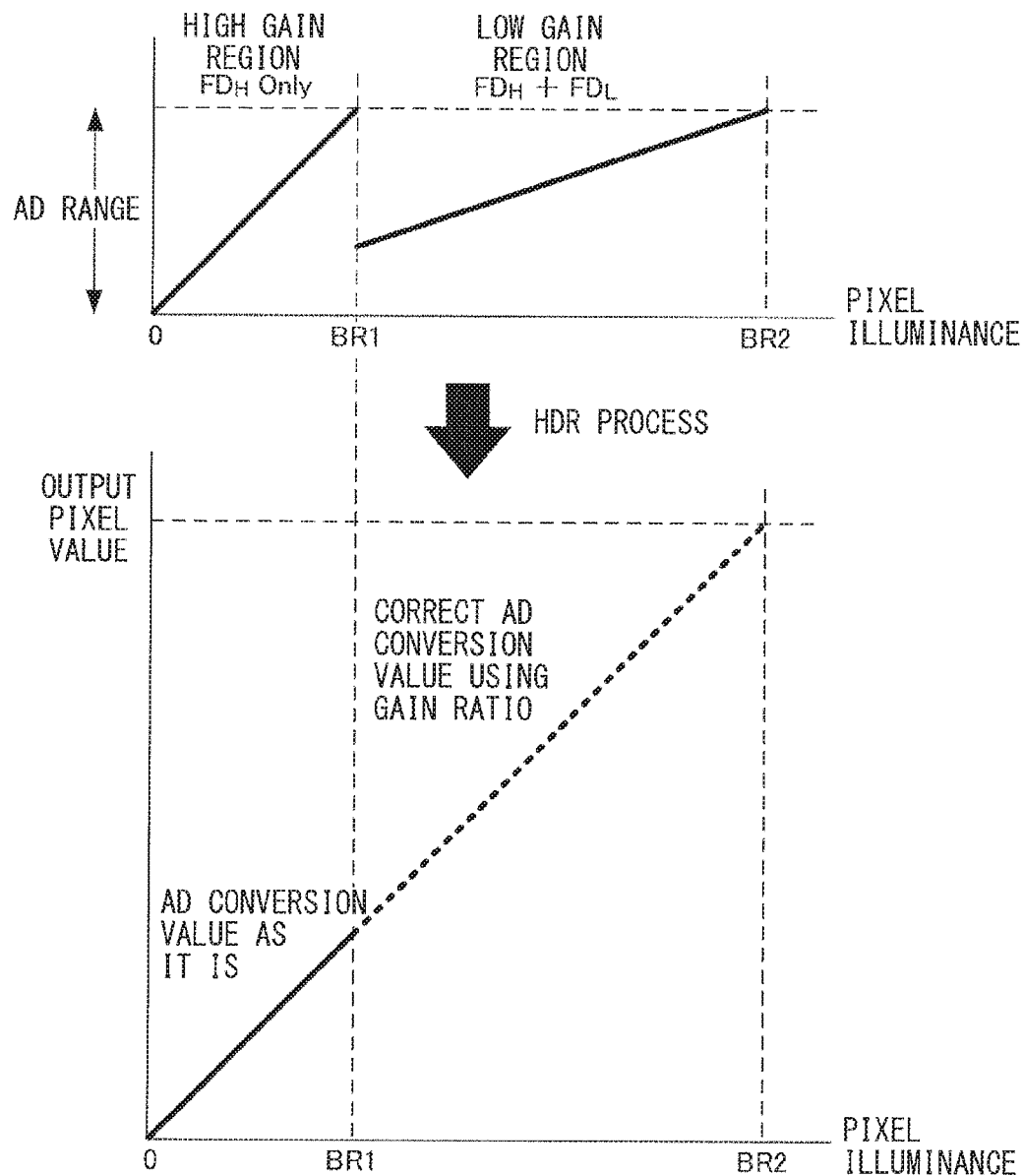

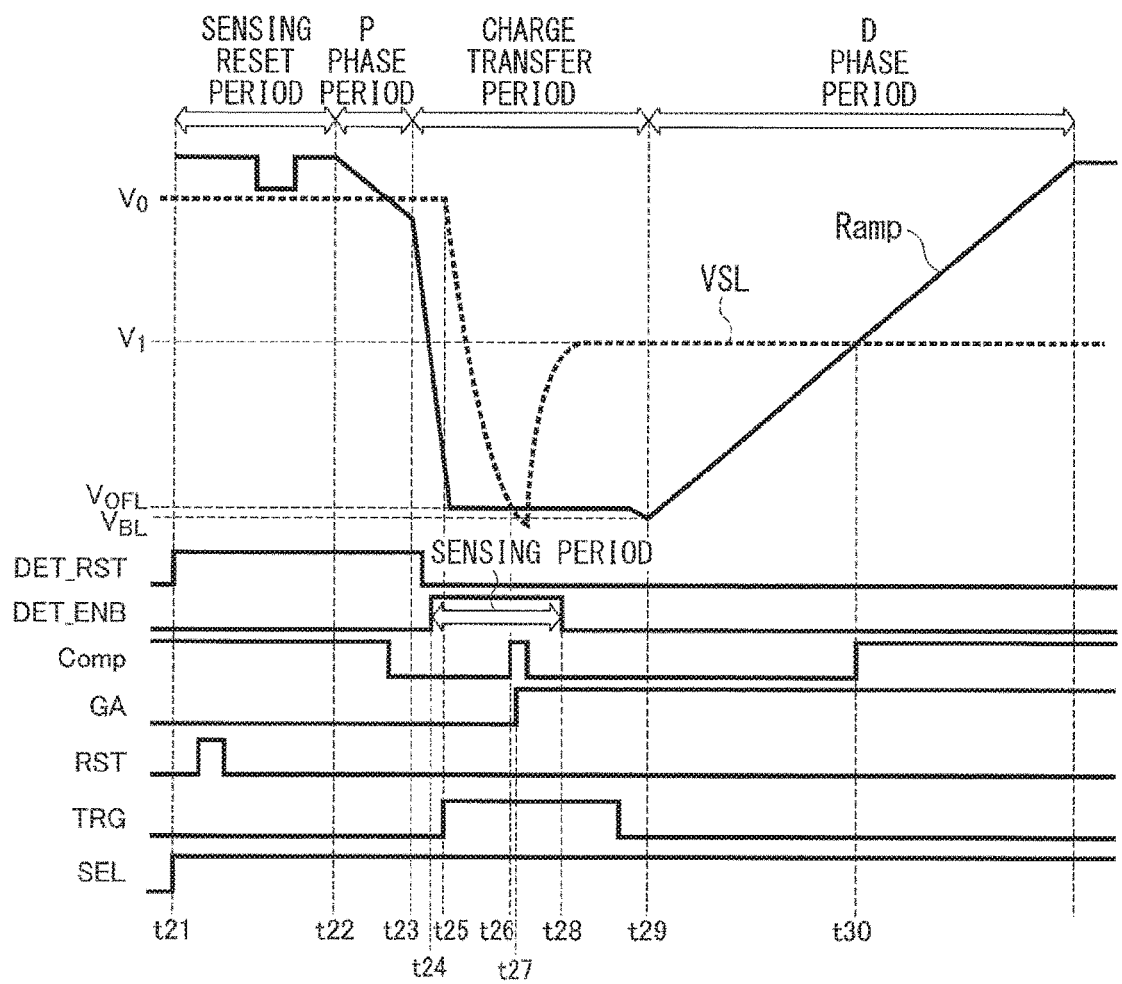
[FIG. 8]

[FIG. 9]
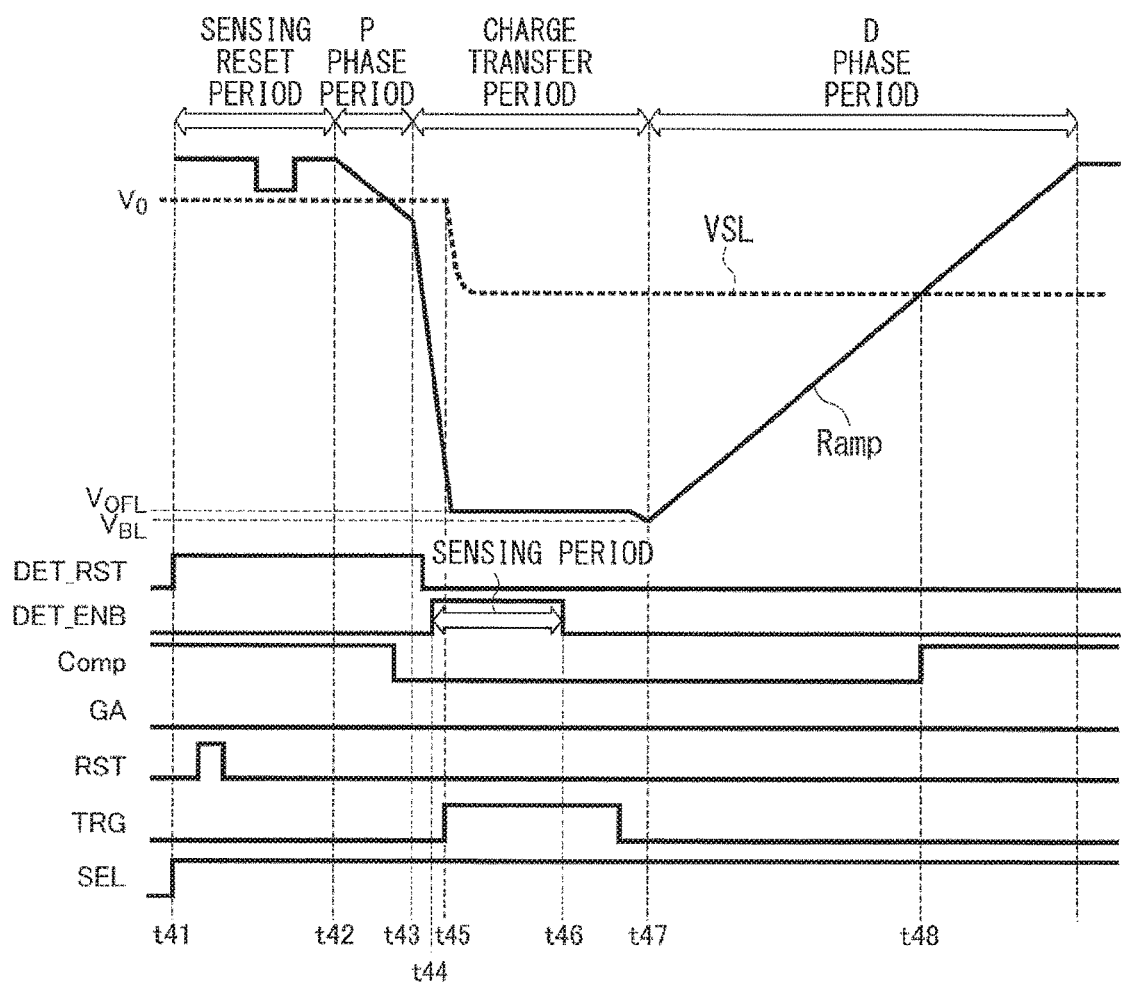

[FIG. 10]
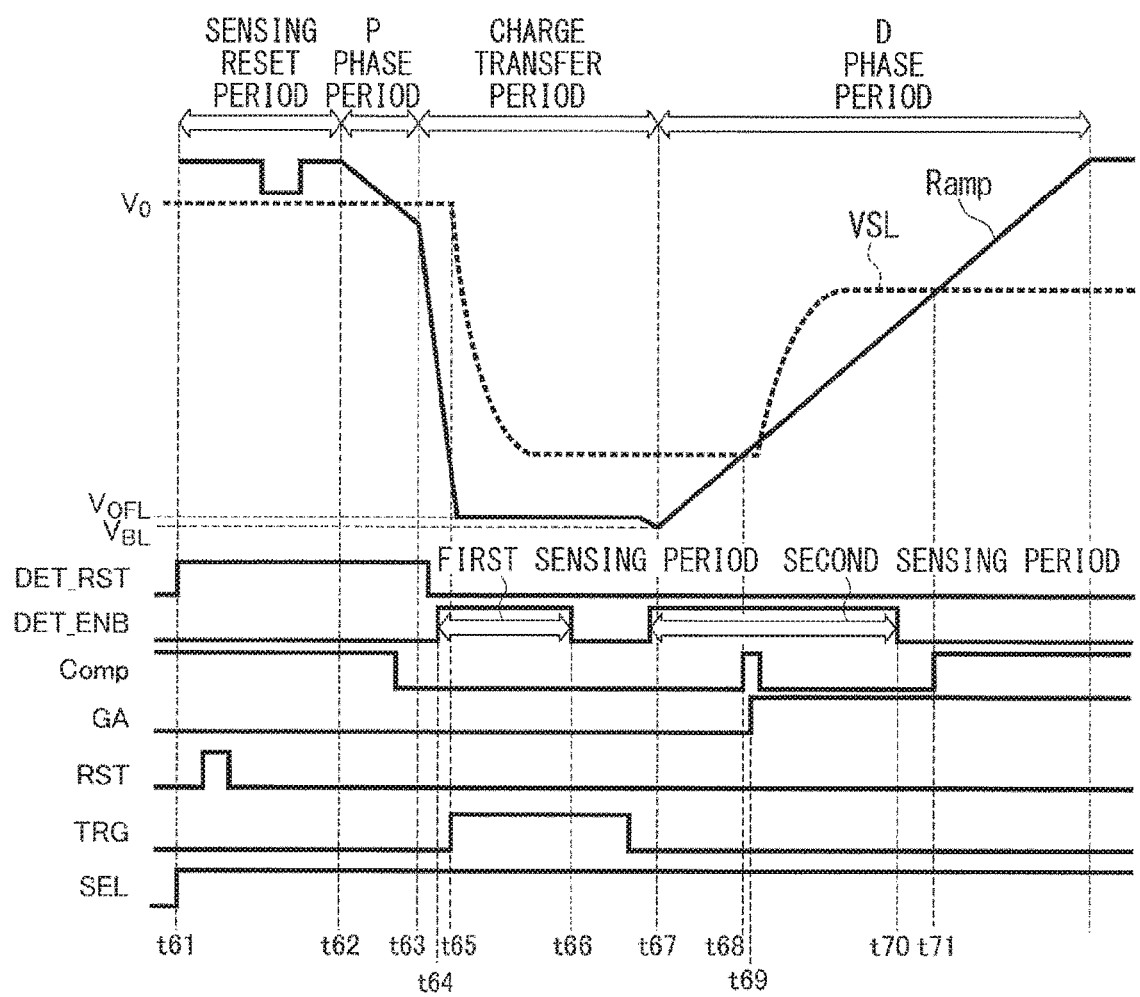

[FIG. 11]
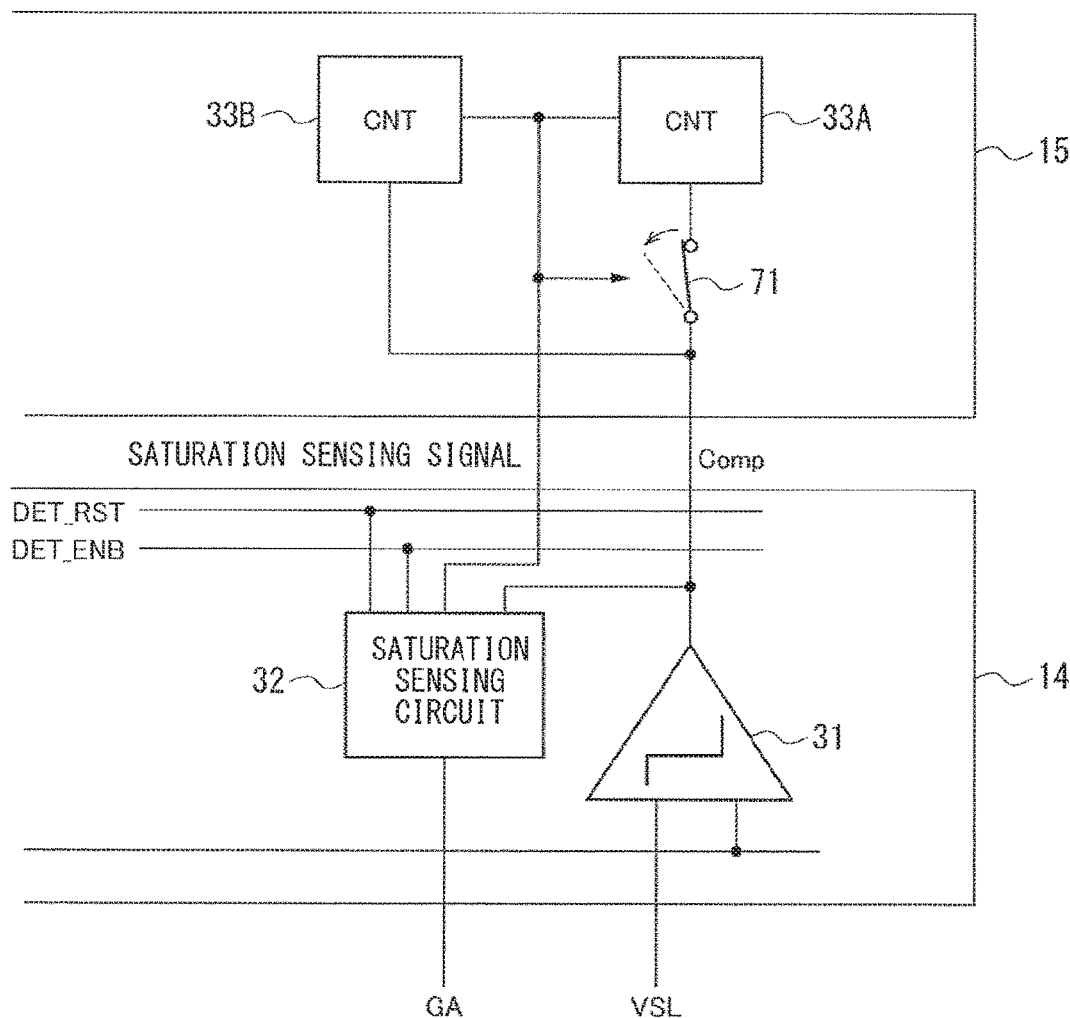

[FIG. 12]
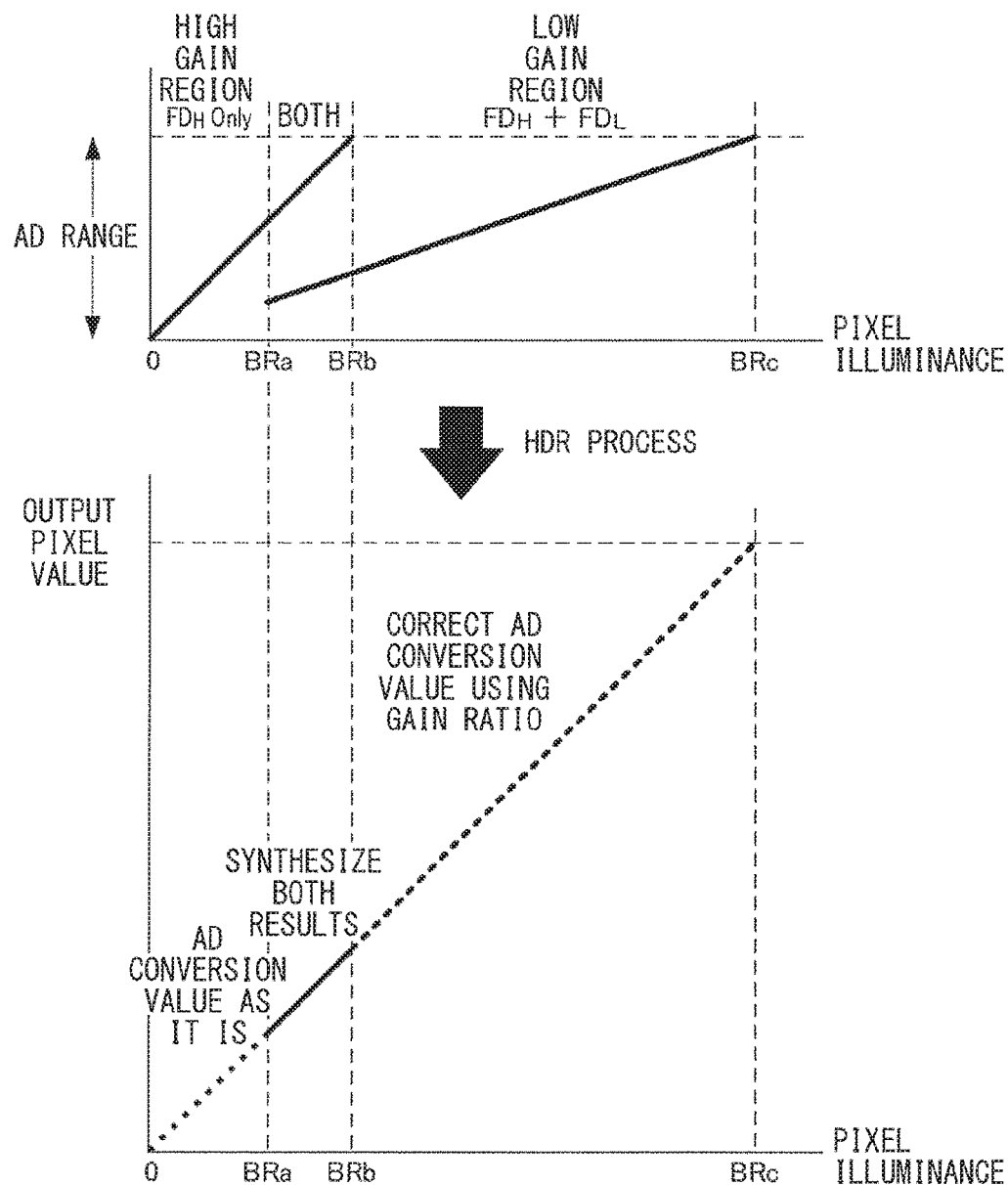

[FIG. 13]
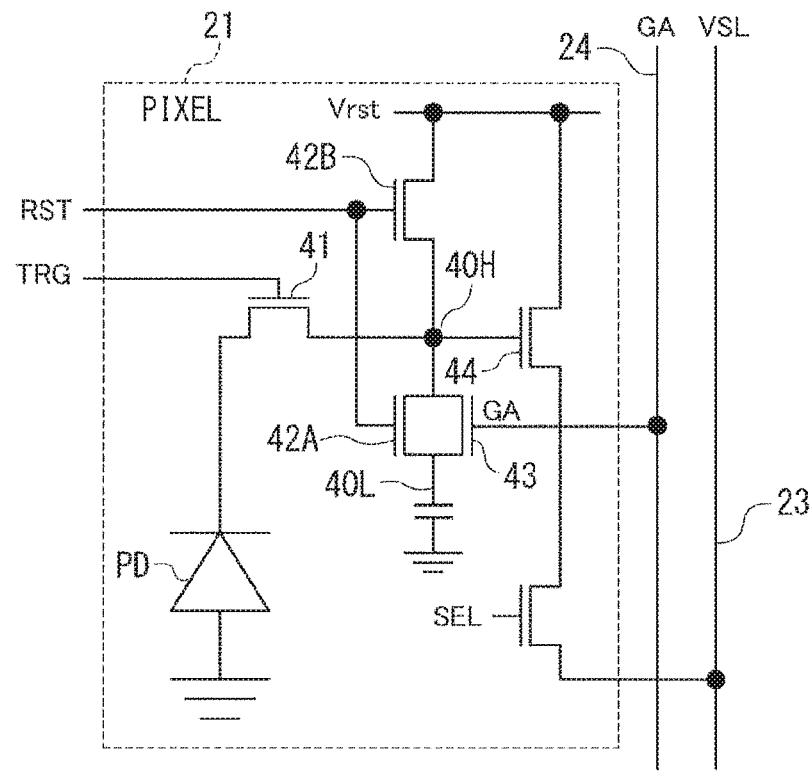
[FIG. 14]
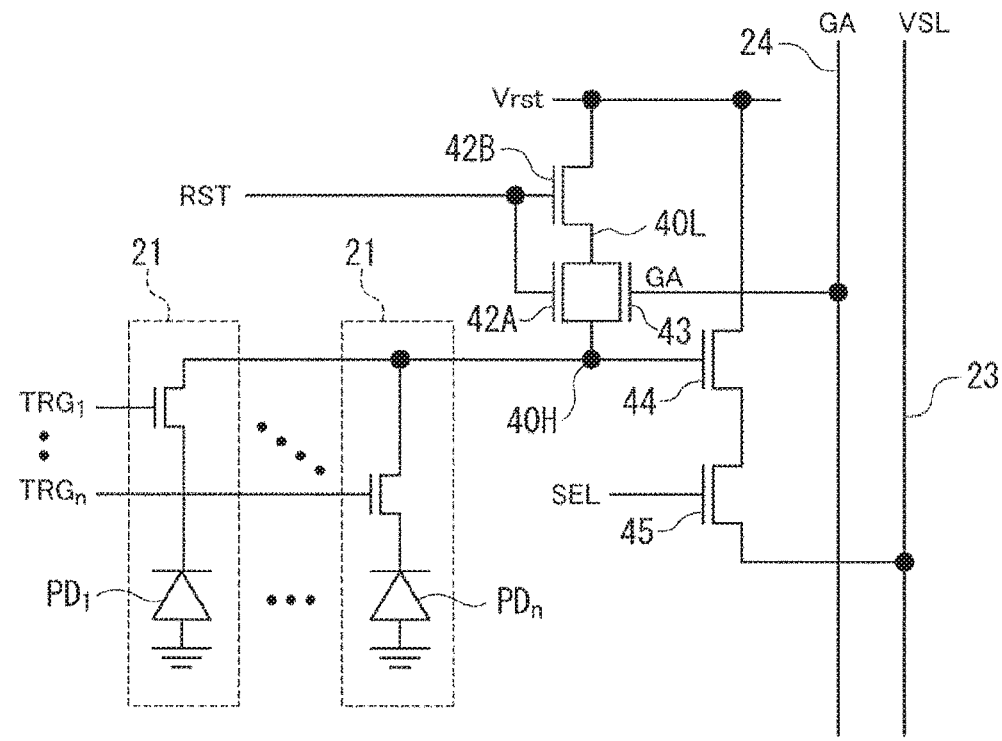

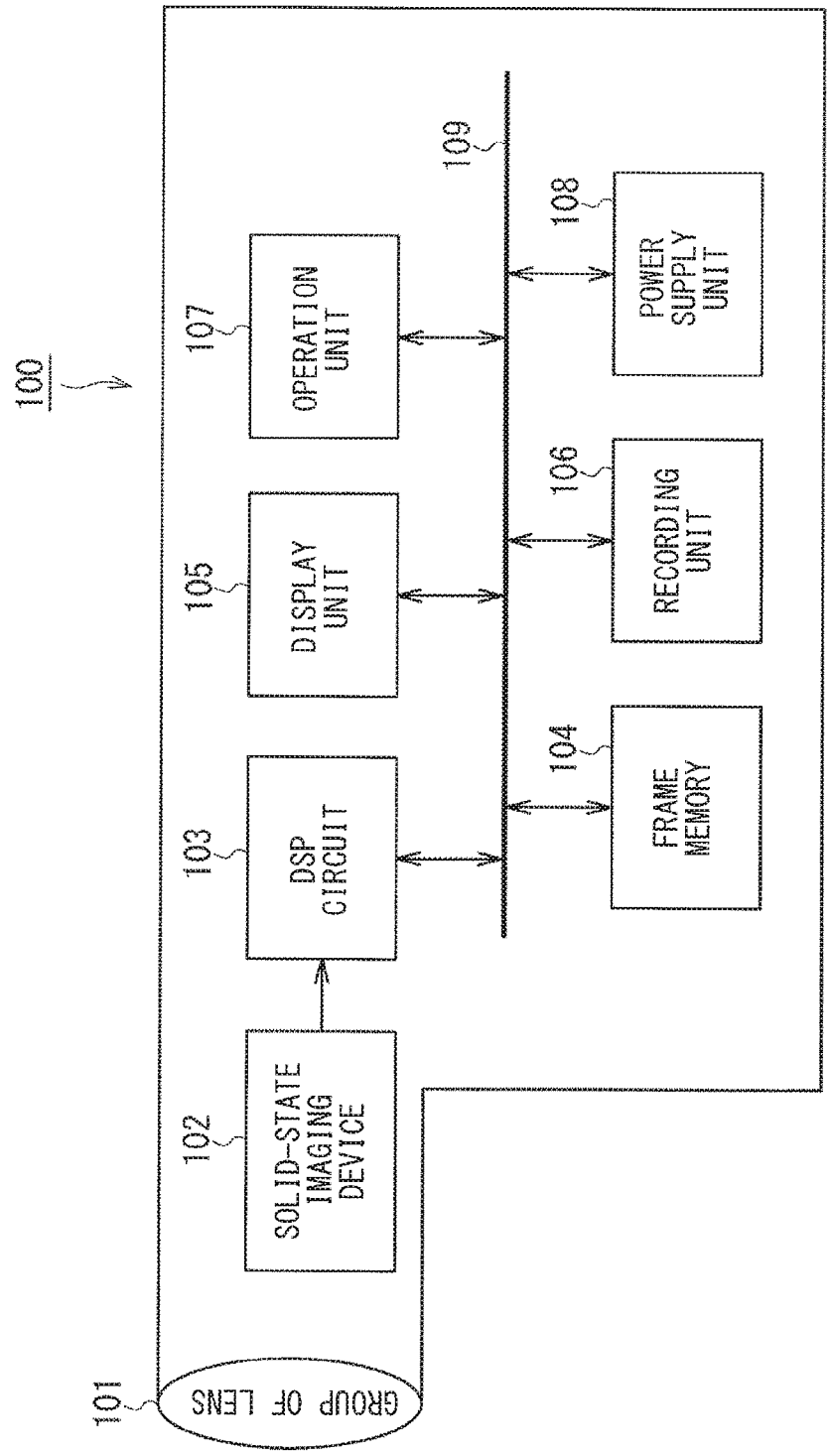
[FIG. 15]

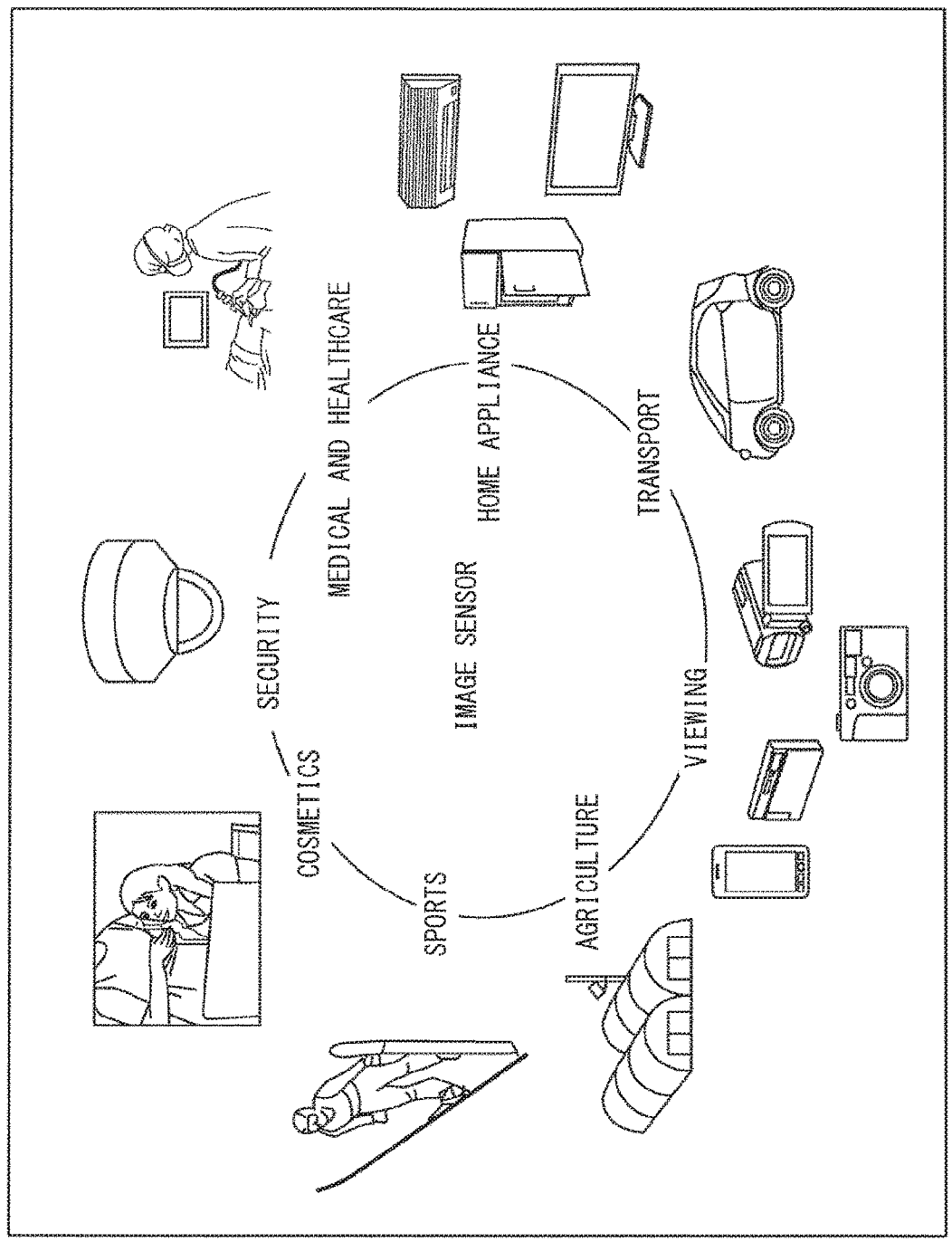
[FIG. 16]

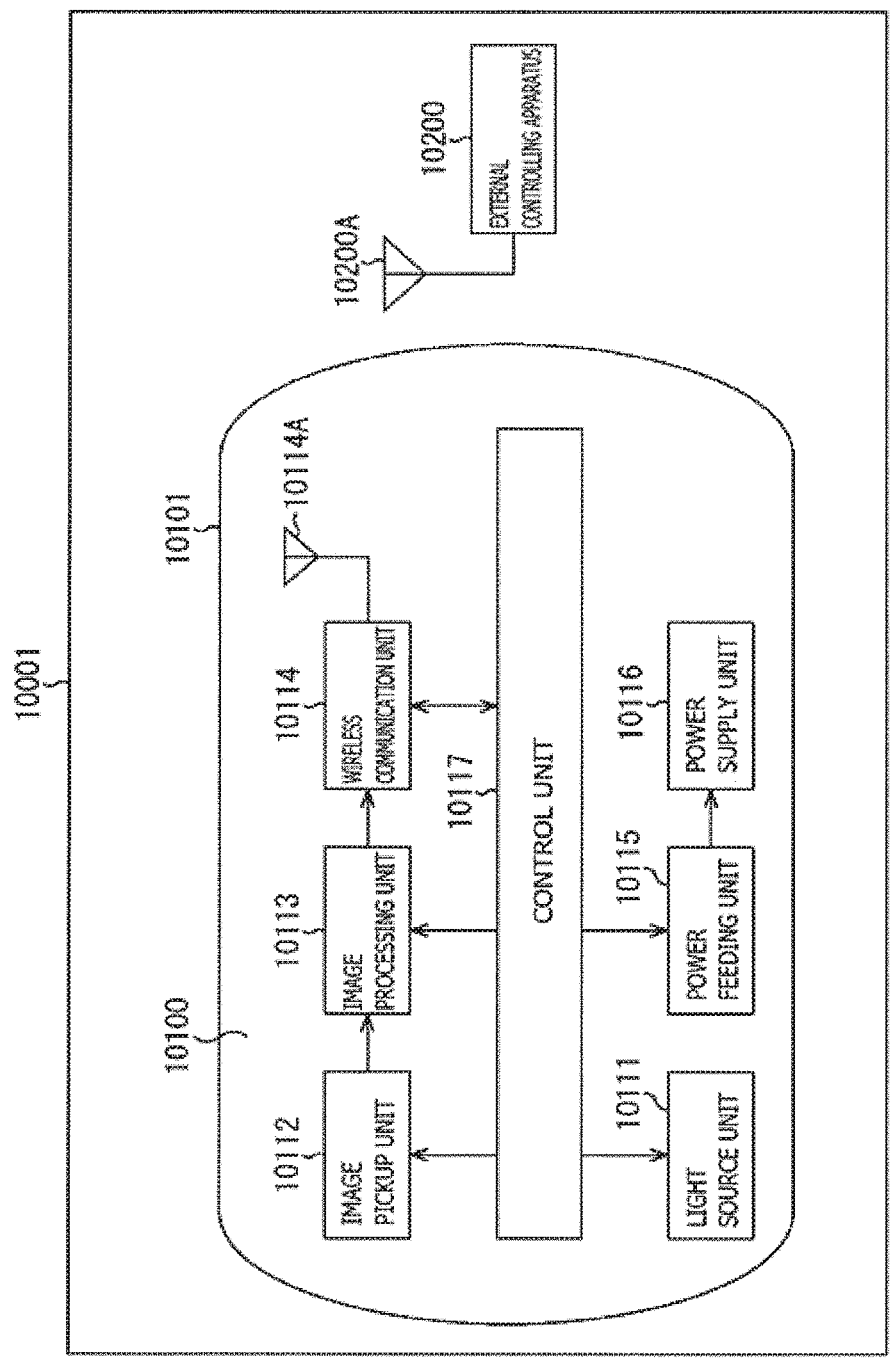
[FIG. 17]

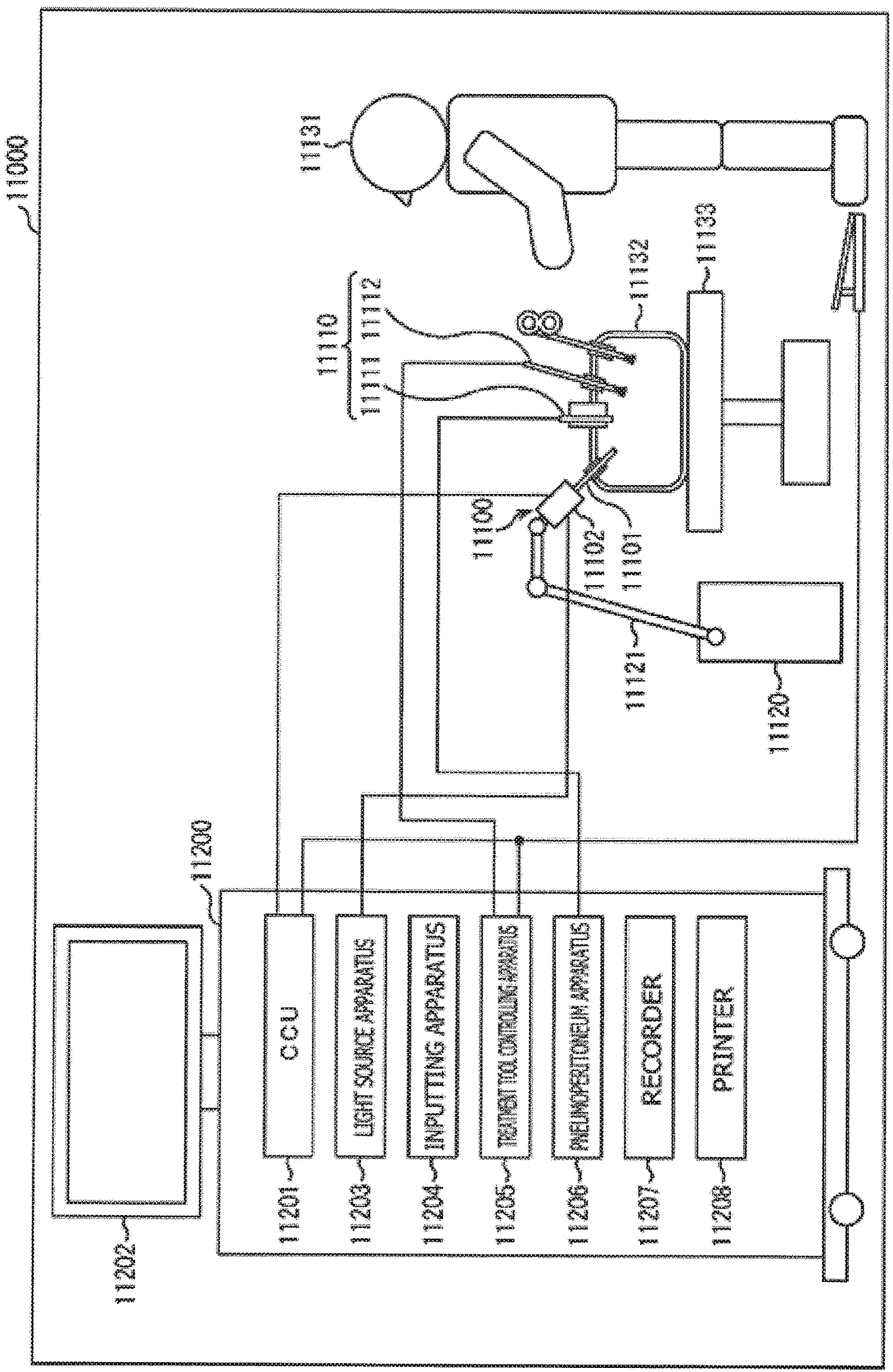

[FIG. 19]
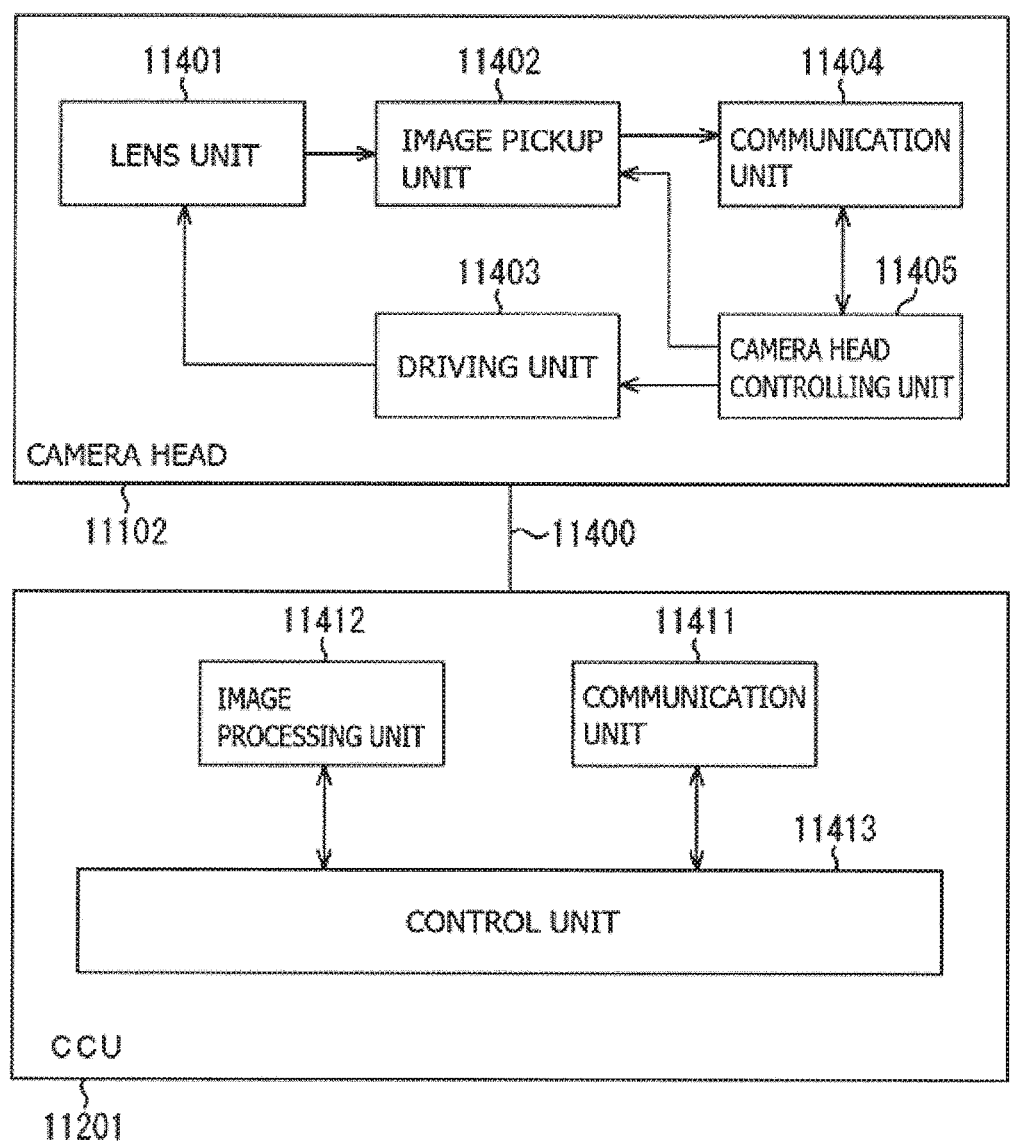

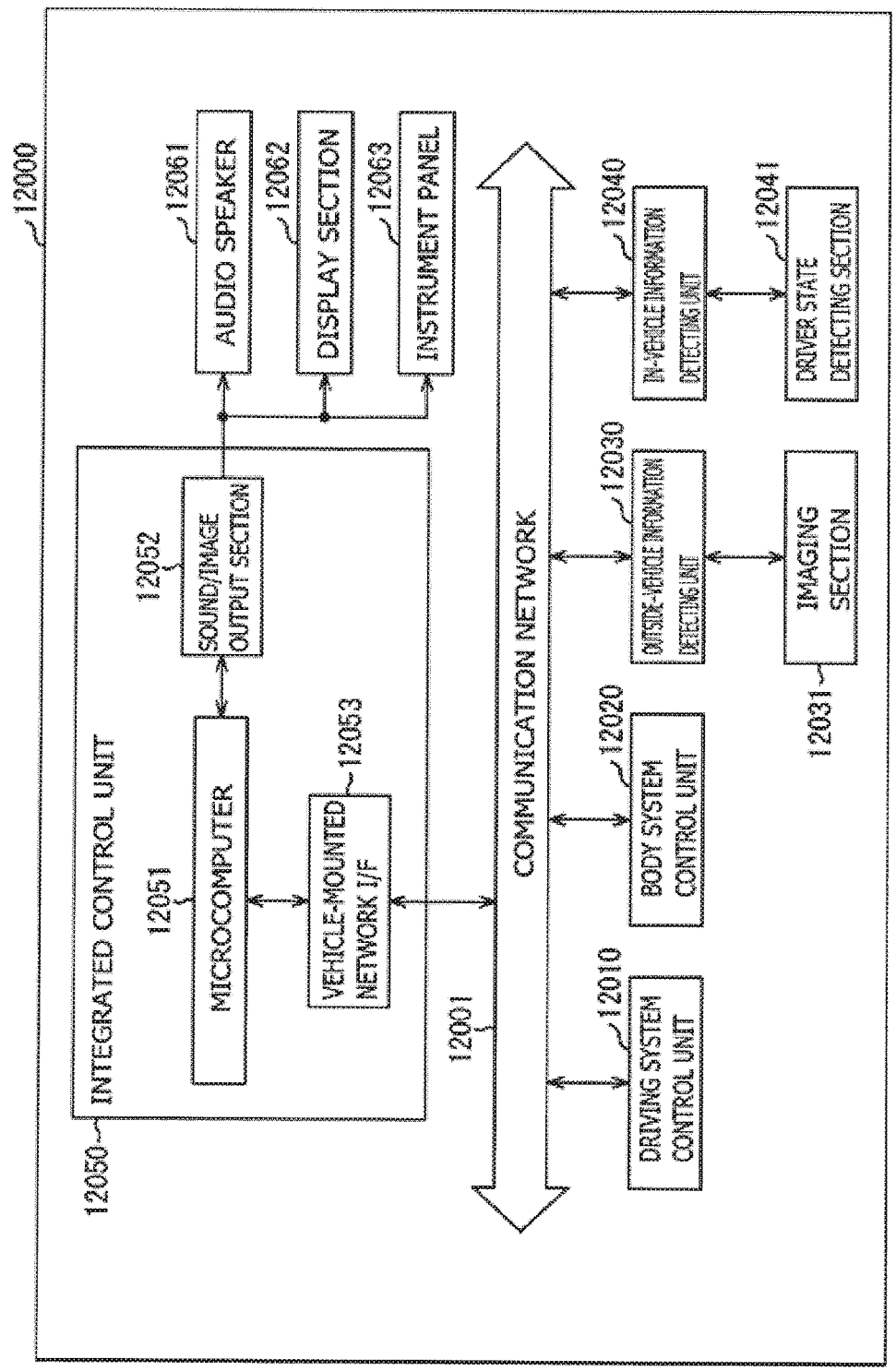
[FIG. 20]

[FIG. 21]
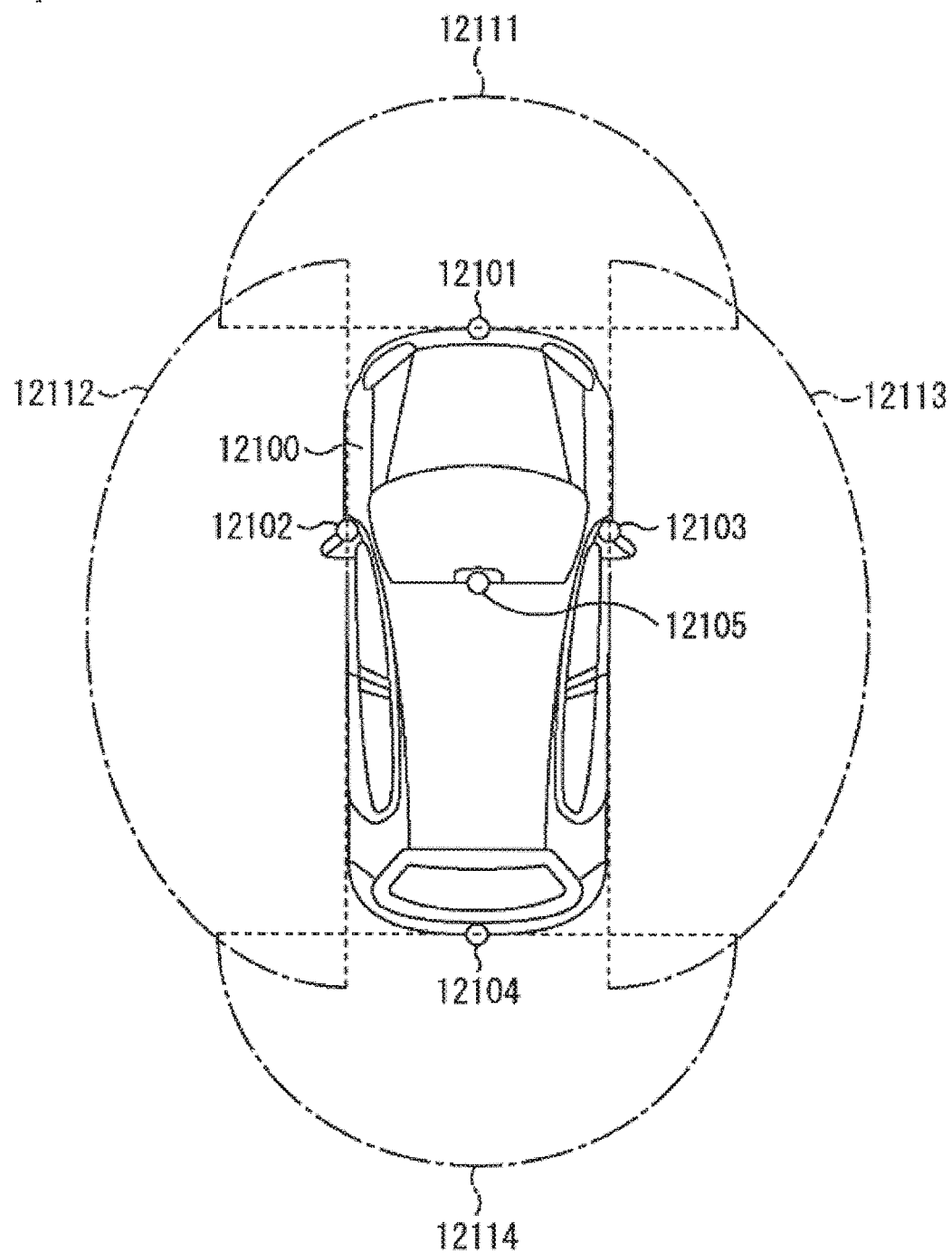

SOLID-STATE IMAGING DEVICE, METHOD OF CONTROLLING THE SOLID-STATE IMAGING DEVICE, AND ELECTRONIC APPARATUS TO GENERATE HIGH DYNAMIC RANGE IMAGE

CROSS REFERENCE TO RELATED APPLICATIONS

This application is a U.S. National Phase of International Patent Application No. PCT/JP2018/025656 filed on Jul. 6, 2018, which claims priority benefit of Japanese Patent Application No. JP 2017-141536 filed in the Japan Patent Office on Jul. 21, 2017. Each of the above-referenced applications is hereby incorporated herein by reference in its entirety.

TECHNICAL FIELD

The present technology relates to a solid-state imaging device, a method of controlling the same, and an electronic apparatus, and in particular, relates to a solid-state imaging device, a method of controlling the same, and an electronic apparatus, which make it possible to generate an HDR image in an easier manner.

BACKGROUND ART

Various types of techniques that achieve an HDR (High Dynamic Range) image having an expanded dynamic range have been known.

A first technique that achieves an HDR image includes, for example, a technique in which HDR synthesizing is applied along the time dimension to a plurality of images with different exposure times (see, for example, PTL 1). This method, however, takes longer time to read out images a plurality of times, which results in a deterioration in frame rate. In addition, reading-out a plurality of times leads to an increase in the power consumption. Moreover, this involves synthesizing a plurality of images with different imaging timings, which leads to poor performance in imaging a subject in motion.

A second technique that achieves an HDR image includes a technique in which: a plurality of pixels is arranged in a pixel array unit; the sensitivities of the pixels are caused to vary by using various exposure times, photodiode areas, areas of FD (floating diffusion) that accumulates charges, or the like; and HDR synthesizing is performed along the dimension of space (see, for example, PTL 2). However, resolution is decreased with this method.

A third technique that achieves an HDR image includes a technique in which a transfer gate voltage for a charge in a photodiode is controlled to perform partial read-out several times, and HDR synthesizing is performed through signal processing in a later stage (see, for example, PTL 3). However, this method also includes a plurality of times of reading-out, which leads to an increase in time. This results in a reduction in frame rate, and an increase in power consumption. Furthermore, images with different imaging timings are synthesized, which means a poor performance in imaging of a subject in motion. In addition, there is a possibility of variation in characteristics in a screen due to voltage control.

Furthermore, in a case of synthesizing a plurality of images with different imaging timings, complicated processing circuits are necessary in a later stage, which includes, for example, providing a motion sensing circuit for a subject in motion, and providing a space filter for HDR synthesizing along the dimension of space.

CITATION LIST

Patent Literature

PTL 1: Japanese Unexamined Patent Application Publication No. 2000-50151
PTL 2: Japanese Unexamined Patent Application Publication No. 2013-216600
PTL 3: Japanese Unexamined Patent Application Publication No. 2011-259492

SUMMARY OF THE INVENTION

Problem to be Solved by the Invention

The present technology has been made in view of the circumstances described above, and makes it possible to generate an HDR image in an easier manner.

Means for Solving the Problem

A solid-state imaging device according to a first embodiment of the present technology includes: first and second charge holders that hold a charge generated in a photoelectric converter of a pixel; a coupling transistor that turns on and off coupling of the first charge holder and the second charge holder; and a control circuit that performs a control that couples the first charge holder and the second charge holder, when a voltage of a pixel signal outputted from the pixel matches a voltage of a ramp signal, in which level of the ramp signal varies in accordance with elapsed time.

A method of controlling a solid-state imaging device according to a second embodiment of the present technology controls the solid-state imaging device that includes: first and second charge holders that hold a charge generated in a photoelectric converter of a pixel; a coupling transistor that turns on and off coupling of the first charge holder and the second charge holder; and a control circuit that controls the coupling transistor. The method includes performing, with the control circuit, a control that couples the first charge holder and the second charge holder, when a voltage of a pixel signal outputted from the pixel matches a voltage of a ramp signal, in which a level of the ramp signal varies in accordance with elapsed time.

An electronic apparatus according to a third embodiment of the present technology includes a solid-state imaging device that includes: first and second charge holders that hold a charge generated in a photoelectric converter of a pixel; a coupling transistor that turns on and off coupling of the first charge holder and the second charge holder; and a control circuit that performs a control that couples the first charge holder and the second charge holder, when a voltage of a pixel signal outputted from the pixel matches a voltage of a ramp signal, in which a level of the ramp signal varies in accordance with elapsed time.

According to the first to third embodiments of the present technology, the solid-state imaging device includes: the first and the second charge holders that hold the charge generated in the photoelectric converter of the pixel; the coupling transistor that turns on and off the coupling of the first charge holder and the second charge holder; and the control circuit that controls the coupling transistor. The control is performed that couples the first charge holder and the second charge holder, when the voltage of the pixel signal outputted from the pixel matches the voltage of the ramp signal of which level varies in accordance with the elapsed time.

Each of the solid-state imaging device and the electronic apparatus may be an independent unit, or may be a module built in another unit.

Effects of the Invention

According to the first to third embodiments of the present technology, it is possible to generate an HDR image in an easier manner.

It should be noted that the effect described here is not necessarily given for the purpose of limitation. Any of the effects described in the present disclosure may be achieved.

BRIEF DESCRIPTION OF THE DRAWINGS

FIG. 1 is a block diagram illustrating a schematic configuration of a solid-state imaging device to which the present technology is applied.

FIG. 2 is a diagram illustrating details of a circuit of a pixel and a saturation sensing circuit.

FIGS. 3A and 3B are diagrams illustrating operations of a pixel in a case of high illuminance and in a case of low illuminance.

FIG. 4 is a timing chart illustrating a first drive control of a pixel in a case of high illuminance.

FIG. 5 is a table in which states of saturation sensing circuits are described.

FIG. 6 is a timing chart illustrating a first drive control of a pixel in a case of low illuminance.

FIG. 7 is a diagram illustrating an HDR process.

FIG. 8 is a timing chart illustrating a second drive control of a pixel in a case of high illuminance.

FIG. 9 is a timing chart illustrating a second drive control of a pixel in a case of low illuminance.

FIG. 10 is a timing chart illustrating a third drive control of a pixel in a case of high illuminance.

FIG. 11 is a diagram illustrating an example of a configuration of a counter unit in a case of performing the third drive control.

FIG. 12 is a diagram illustrating an HDR process in the third drive control.

FIG. 13 is a diagram illustrating another circuit configuration of a pixel.

FIG. 14 is a diagram illustrating still another circuit configuration of a pixel.

FIG. 15 is a block diagram illustrating an example of a configuration of an imaging unit serving as an electronic apparatus to which the present technology is applied.

FIG. 16 is a diagram illustrating examples of use of an image sensor.

FIG. 17 is a block diagram depicting an example of a schematic configuration of an in-vivo information acquisition system.

FIG. 18 is a view depicting an example of a schematic configuration of an endoscopic surgery system.

FIG. 19 is a block diagram depicting an example of a functional configuration of a camera head and a camera control unit (CCU).

FIG. 20 is a block diagram depicting an example of schematic configuration of a vehicle control system.

FIG. 21 is a diagram of assistance in explaining an example of installation positions of an outside-vehicle information detecting section and an imaging section.

MODES FOR CARRYING OUT THE INVENTION

Below, modes (hereinafter, referred to as "embodiments") for carrying out the present technology will be described. Note that description will be given in the following order.
1. Entire Configuration of Solid-State Imaging Device
2. Detailed Configuration of Pixel and Saturation Sensing Circuit
3. First Drive Control
4. Second Drive Control
5. Third Drive Control
6. Other Circuit Configuration of Pixel
7. Conclusion
8. Example of Application to Electronic Apparatus
9. Example of Application to In-Vivo Information Acquisition System
10. Example of Application to Endoscopic Surgery System
11. Example of Application to Mobile Body 1. Entire Configuration of Solid-State Imaging Device FIG. 1 is a block diagram illustrating a schematic configuration of a solid-state imaging device to which the present technology is applied.

A solid-state imaging device 1 illustrated in FIG. 1 includes at least a pixel array unit 11, a vertical scan circuit 12, a DAC (Digital to Analog Converter) 13, a comparing unit 14, a counter unit 15, a horizontal scan circuit 16, a signal processing unit 17, an output unit 18, and a timing controller 19.

The pixel array unit 11 includes a plurality of pixels 21 arranged two-dimensionally in a matrix manner in a row direction as well as in a column direction. A reset signal RST, a transfer signal TRG, and a selection signal SEL are supplied from the vertical scan circuit 12 via each drive wiring line 22 to each of the pixels 21 arranged in the matrix manner. Each of the pixels 21 transmits a pixel signal VSL generated through photoelectric conversion in a photoelectric converter such as a photodiode, via a first vertical signal line 23 in a column direction, and outputs it to the comparing unit 14.

The comparing unit 14 includes a comparator (comparing section) 31 and a saturation sensing circuit 32 provided so as to correspond to each pixel column of the pixel array unit 11. In addition, the counter unit 15 includes a counter (CNT) 33 provided so as to correspond to each pixel column of the pixel array unit 11. Thus, the number of each of the comparator 31, the saturation sensing circuit 32, and the counter 33 provided is equal to the number of pixel columns.

The pixel 21 has a circuit configuration, which will be described later with reference to FIG. 2. The pixel 21 includes a high sensitivity FD 40H for high sensitivity and a low sensitivity FD 40L (FIG. 2) for low sensitivity, each of which serves as an FD (floating diffusion). The pixel 21 switches between a high sensitivity for low illuminance and a low sensitivity for high illuminance according to a charge generated through reception of light. Only the high sensitivity FD 40H for high sensitivity is used in a case of the high sensitivity for low illuminance. Both the high sensitivity FD 40H and the low sensitivity FD 40L are used in a case of the low sensitivity for high illuminance. An FD control signal GA used to switch between the high sensitivity and the low sensitivity is supplied from the saturation sensing circuit 32 on the same column via a second vertical signal line 24 to each of the pixels 21.

Each of the drive wiring lines 22 used to transmit the reset signal RST, the transfer signal TRG, or the selection signal SEL is wired to the arrangement of pixels in the matrix manner in the pixel array unit 11 and along the horizontal direction for each pixel row. The first vertical signal line 23 and the second vertical signal line 24 are wired along the vertical direction for each pixel column.

The vertical scan circuit 12 includes, for example, a shift register and an address decoder. The vertical scan circuit 12 drives all of the pixels 21 of the pixel array unit 11 at a time, or drives the pixels 21 on a row basis, or the like.

The DAC 13 generates a ramp signal Ramp of which level (voltage) varies in a stepwise manner according to elapsed time, and supplies it to each of comparators 31 in the comparing unit 14.

Each of the comparators 31 of the comparing unit 14 compares a voltage of the pixel signal VSL supplied from the pixel 21 on the same column via the first vertical signal line 23 with a voltage of the ramp signal Ramp supplied from the DAC 13, and outputs a comparison result Comp thereof to the saturation sensing circuit 32 and the counter 33.

In addition to the comparison result Comp supplied from the comparator 31, a sensing reset signal DET_RST and a sensing enable signal DET_ENB are supplied from the timing controller 19 to each of the saturation sensing circuits 32 of the comparing unit 14.

Each of the saturation sensing circuits 32 senses saturation of the high sensitivity FD 40H during a sensing period indicated by the sensing enable signal DET_ENB, on the basis of the comparison result Comp from the comparator 31. The saturation sensing circuit 32 outputs, to the pixel 21, a saturation sensing result indicating whether or not the high sensitivity FD 40H is saturated, as the FD control signal GA used to switch between the high sensitivity and the low sensitivity. In a case where the FD control signal GA indicating that the high sensitivity FD 40H is saturated is supplied, the sensitivity of the pixel 21 switches from the high sensitivity to the low sensitivity.

Each of counters 33 of the counter unit 15 counts comparison periods of the comparator 31. More specifically, each of the counters 33 counts a time until which the comparison result Comp obtained by comparing the pixel signal VSL and the ramp signal Ramp changes from a Hi-level to a Lo-level or from the Lo-level to the Hi-level.

For example, the counter 33 performs down-count only during a period of time when the comparison result Comp with the Hi-level is supplied in a P phase (Preset Phase) period, and performs up-count only during a period of time when the comparison result Comp with the Hi-level is supplied in a D phase (Data Phase) period. In addition, the counter 33 sets a result of addition of a down-count value in the P phase period and an up-count value in the D phase period, as pixel data after a CDS (Correlated Double Sampling) process and an AD conversion process.

Furthermore, the counter 33 performs an HDR process in which the pixel data that has been subjected to the AD conversion process is converted into pixel data with an HDR (High Dynamic Range), on the basis of the saturation sensing result by the saturation sensing circuit 32. The counter 33 outputs the pixel data after the HDR process, to the horizontal scan circuit 16.

It should be noted that it may be possible to perform the up-count in the P phase period, and perform the down-count in the D phase period.

The comparator 31, the saturation sensing circuit 32, and the counter 33 constitute an AD converter that performs the CDS process and the AD conversion process on a pixel signal.

The horizontal scan circuit 16 includes, for example, a shift register and an address decoder. The horizontal scan circuit 16 sequentially selects a plurality of counters 33 in the counter unit 15 in a predetermined order. The horizontal scan circuit 16 performs selection and scanning to sequentially output, to the signal processing unit 17, pixel data (pixel signals after the AD conversion) that the counter 33 temporarily holds.

The signal processing unit 17 performs a predetermined signal process on signals sequentially supplied from the horizontal scan circuit 16, and outputs them to the output unit 18. For example, the signal processing unit 17 may only perform buffering, and in some cases, may perform various types of digital signal processing such as black-level adjustment or column-variation correction. Note that, in the description above, the HDR process is performed by each of the counters 33. However, the HDR process may be performed by the signal processing unit 17.

The output unit 18 outputs the pixel signal (HDR image signal) after the HDR process in the solid-state imaging device 1 to the outside.

The timing controller 19 includes, for example, a timing generator that generates various types of timing signal. The timing controller 19 performs drive control, for example, of the vertical scan circuit 12, the DAC 13, the counter unit 15, and the horizontal scan circuit 16 on the basis of various types of timing generated by the timing generator. In addition, the timing controller 19 generates the sensing reset signal DET_RST and the sensing enable signal DET_ENB to supply them to the saturation sensing circuit 32 of the comparing unit 14.

The solid-state imaging device 1 configured as described above includes a CMOS imaging sensor called a column AD system in which the AD converter that performs the CDS process and the AD conversion process is disposed for each pixel column.

The solid-state imaging device 1 includes an imaging device that is able to automatically adjust the sensitivity by the unit of pixel of the pixel array unit 11, and on the basis of the result thereof, output pixel data of an HDR image.

It should be noted that, of course, the solid-state imaging device 1 is able to change operating modes to perform imaging in a normal mode in which the dynamic range is not expanded.

2. Detailed Configuration of Pixel and Saturation Sensing Circuit

Detailed of a circuit of the pixel 21 and the saturation sensing circuit 32 will be described with reference to FIG. 2.

FIG. 2 illustrates one pixel 21, and also illustrates a comparator 31, the saturation sensing circuit 32, and a counter 33, each of which is disposed on the same pixel column as the pixel 21.

The pixel 21 includes a photodiode PD, two FDs, which are a high sensitivity FD 40H and a low sensitivity FD 40L, a transfer transistor 41, a first reset transistor 42A, a second reset transistor 42B, an FD coupling transistor 43, an amplification transistor 44, and a selection transistor 45.

The photodiode PD generates and accumulates a charge (signal charge) that corresponds to the amount of light received. The photodiode PD includes an anode terminal coupled to the ground, and a cathode terminal coupled to the high sensitivity FD 40H via the transfer transistor 41.

Upon being turned on with the transfer signal TRG, the transfer transistor 41 reads out the charge generated by the photodiode PD, and transfers it to the high sensitivity FD 40H.

The high sensitivity FD 40H and the low sensitivity FD 40L hold charges read out from the photodiode PD. For example, the high sensitivity FD 40H is formed such that the capacity of charge that it can hold is lower than that of the low sensitivity FD 40L, thereby being set to have higher sensitivity than that of the low sensitivity FD 40L. Note that the charge capacity of the high sensitivity FD 40H is not necessarily lower than the charge capacity of the low sensitivity FD 40L. For example, the high sensitivity FD 40H and the low sensitivity FD 40L may have an equal charge capacity. When the FD coupling transistor 43 is turned on, the high sensitivity FD 40H and the low sensitivity FD 40L configure one charge accumulating unit.

Upon being turned on with the reset signal RST, the first reset transistor 42A and the second reset transistor 42B cause the high sensitivity FD 40H and the low sensitivity FD 40L to be coupled to the drain of the second reset transistor 42B to which a predetermined reset voltage Vrst is applied, whereby the charges accumulated in the high sensitivity FD 40H and the low sensitivity FD 40L are discharged. The reset voltage Vrst is set, for example, to a constant-voltage power supply VDD.

The FD coupling transistor 43 controls (turns on and off) the high sensitivity FD 40H and the low sensitivity FD 40L so as to be coupled to each other, on the basis of the FD control signal GA supplied from the saturation sensing circuit 32 via the second vertical signal line 24.

The amplification transistor 44 outputs pixel signals that correspond to electric potentials of the high sensitivity FD 40H and the low sensitivity FD 40L. That is, the amplification transistor 44 constitutes a load MOS (not illustrated) and a source follower circuit, each of which serves as a constant current source coupled via the first vertical signal line 23. The pixel signal VSL indicating a level that corresponds to the charge accumulated in the high sensitivity FD 40H and the low sensitivity FD 40L is outputted from the amplification transistor 44 via the selection transistor 45 to the comparator 31 of the comparing unit 14.

Upon the pixel 21 being selected with the selection signal SEL, the selection transistor 45 is turned on, and outputs the pixel signal VSL of the pixel 21 via the first vertical signal line 23 to the comparator 31. Individual signal lines that allow the transfer signal TRG, the selection signal SEL, and the reset signal RST to be transmitted correspond to respective drive wiring lines 22 in FIG. 1.

The saturation sensing circuit 32 includes an AND circuit 51, and two NOR circuits 52 and 53 that constitute a flip flop circuit.

The comparison result Comp serving as the output of the comparator 31 and the sensing enable signal DET_ENB from the timing controller 19 are inputted into the AND circuit 51. The AND circuit 51 performs AND (logical AND) computation of the comparison result Comp and the sensing enable signal DET_ENB, and supplies the computation result to the NOR circuit 52. The output signal of the AND circuit 51 is denoted as SIG_A.

The output of the NOR circuit 53 and the AND signal based on the comparison result Comp and the sensing enable signal DET_ENB and serving as the output of the AND circuit 51 are inputted into the NOR circuit 52. The NOR circuit 52 performs NOR (logical NOR) computation of the output of the NOR circuit 53 and the AND signal based on the comparison result Comp and the sensing enable signal DET_ENB. The NOR circuit 52 supplies the computation result thereof to the NOR circuit 53. The output signal of the NOR circuit 52 is denoted as SIG_B.

The output of the NOR circuit 52 and the sensing reset signal DET_RST from the timing controller 19 are inputted into the NOR circuit 53. The NOR circuit 53 performs NOR (logical NOR) computation of the output of the NOR circuit 52 and the sensing reset signal DET_RST. The NOR circuit 53 supplies the computation result thereof to the NOR circuit 52, and also supplies it to the FD coupling transistor 43 of the pixel 21 as the FD control signal GA. The output of the NOR circuit 53 is fed back as the input of the NOR circuit 52, and is also supplied to the counter 33 on the same column in the counter unit 15 as the saturation sensing signal.

On the basis of the saturation sensing signal, the counter 33 corrects the pixel data, which has been subjected to the AD conversion process, in accordance with a gain ratio to generate pixel data after the HDR process, and outputs it to the horizontal scan circuit 16.

In other words, the counter 33 performs counting by the predetermined number of bits (for example, 10 bits) on the basis of the comparison result Comp from the comparator 31, and performs AD conversion on an analog pixel signal into digital pixel data. Here, in a case where the saturation sensing signal indicates saturation, the counter 33 corrects the pixel data after the AD conversion using the gain ratio of the low illuminance and the high illuminance, and outputs the corrected pixel data. More specifically, the counter 33 outputs, as pixel data, a result of multiplication of the pixel data that has been subjected to the AD conversion process by a ratio of (the total capacity value of the high sensitivity FD 40H and the low sensitivity FD 40L)/(the capacity value of the high sensitivity FD 40H). On the other hand, in a case where the saturation sensing signal indicates being not saturated, the counter 33 directly outputs, to the horizontal scan circuit 16, the pixel data that has been subjected to the AD conversion process as it is.

Next, operations of the pixel 21 in a case of high illuminance and in a case of low illuminance will be described with reference to the potential diagram of FIGS. 3A and 3B.

FIG. 3A illustrates operations of the pixel 21 in a case of high illuminance.

A reset operation in which the high sensitivity FD 40H and the low sensitivity FD 40L are reset is performed after a predetermined exposure period ends and before a charge accumulated in the photodiode PD is transferred to the FD.

That is, as illustrated in FIG. 3A, a reset signal RST at a Hi-level is supplied to the gates of the first reset transistor 42A and the second reset transistor 42B, and the high sensitivity FD 40H and the low sensitivity FD 40L are reset to be at the reset voltage Vrst.

Once the first reset transistor 42A and the second reset transistor 42B are returned to be off and the reset operation ends, a charge transferring operation starts, the charge transferring operation including transferring the charge accumulated in the photodiode PD to the FD.

In the charge transferring operation, the charge accumulated in the photodiode PD is first transferred to the high sensitivity FD 40H. Then, in a case where the amount of charge transferred exceeds a predetermined overflow level (saturation level), the saturation sensing circuit 32 senses it, and supplies the FD control signal GA at a Hi-level to the FD coupling transistor 43, thereby turning on the FD coupling transistor 43. This causes the high sensitivity FD 40H and the low sensitivity FD 40L to be coupled to each other, and also causes the sensitivity of the pixel 21 to be switched from the high sensitivity for low illuminance to the low sensitivity for high illuminance, as illustrated on the right side of in FIG. 3A.

On the other hand, in a case of low illuminance, the amount of charge transferred from the photodiode PD does not exceed the overflow level as illustrated in of FIG. 3B. Thus, the FD coupling transistor 43 is not turned on. In addition, the charge transferred is accumulated only in the high sensitivity FD 40H, which results in the high sensitivity being maintained.

In the operations of the pixel 21 described above, the overflow level used to switch between the high sensitivity and the low sensitivity is determined by a voltage of the ramp signal Ramp. Thus, it is possible to set the overflow level to be any level by adjusting (varying) the voltage of the ramp signal Ramp.

3. First Drive Control

Operation of Pixel in Case of High Illuminance

Next, description will be made of a first drive control in which the operation of the pixel described with reference to FIGS. 3A and 3B is performed.

First, operation of the pixel 21 in a case of high illuminance will be described with reference to FIGS. 4 and 5.

FIG. 4 is a timing chart illustrating operation of the pixel 21 in a case of high illuminance. FIG. 5 is a table containing input/output signals concerning the comparator 31 and the saturation sensing circuit 32.

FIG. 4 illustrates the pixel signal VSL, the ramp signal Ramp, the sensing reset signal DET_RST, the sensing enable signal DET_ENB, the comparison result Comp, the FD control signal GA, the reset signal RST, the transfer signal TRG, and the selection signal SEL.

In FIG. 4, voltages of the pixel signal VSL and the ramp signal Ramp increase with decrease in level toward the downward direction in the drawing. In FIG. 5, the Hi-level is denoted as "1" and the Lo-level is denoted as "0" for the sensing enable signal DET_ENB, the comparison result Comp, the FD control signal GA, the reset signal RST, the transfer signal TRG, and the selection signal SEL.

From the time t1 at the beginning until the end of a selection period (1H) for the pixel 21, the selection signal SEL at the Hi-level is supplied to the selection transistor 45 of the pixel 21, and the selection transistor 45 is turned on.

A period from the time t1 to a time t2 corresponds to a sensing reset period in which the saturation sensing circuit 32 is reset. In the sensing reset period, the sensing reset signal DET_RST is set at the Hi-level, and the FD control signal GA indicating a saturation sensing result (saturation history) on and before this period is reset.

A state ST_A in the table in FIG. 5 indicates a state immediately after the sensing reset signal DET_RST is set to be at the Hi-level.

In a case where the sensing reset signal DET_RST is set to be at the Hi-level ("1"), the FD control signal GA serving as the output of the NOR circuit 53 is at the Lo-level ("0"). Thus, the saturation sensing result (saturation history) is reset.

Furthermore, at a predetermined timing during the sensing reset period, the reset signal RST to be supplied to the pixel 21 is set to be at the Hi-level. In addition, the first reset transistor 42A and the second reset transistor 42B are turned on as described above with reference to FIGS. 3A and 3B. Moreover, the high sensitivity FD 40H and the low sensitivity FD 40L are reset to the reset voltage Vrst.

A period from the time t2 to a time t3 corresponds to a P phase period in which a reset level of the CDS process is detected. In the P phase period, a comparison is made between a voltage of the pixel signal VSL and a voltage of the ramp signal Ramp to detect a timing at which the voltage of the pixel signal VSL and the voltage of the ramp signal Ramp match. In addition, the reset level is detected.

Next, a period from the time t3 to a time t9 corresponds to a charge transfer period in which a charge accumulated in the photodiode PD is transferred to the FD.

In the first half of this charge transfer period until a time t8 from a time t4 after a predetermined time elapses from the time t3, the sensing enable signal DET_ENB is set to be at the Hi-level ("1"). In addition, a sensing period is set, in which sensing is made as to whether the transfer charge exceeds the overflow level, in other words, sensing is made as to switching of the sensitivity of the pixel 21 from the high sensitivity for low illuminance to the low sensitivity for high illuminance. Note that the sensing reset signal DET_RST that has been set to be at the Hi-level at the time t1 is caused to return to the Lo-level during a period from the time t3 to the time t4.

In the charge transfer period, a voltage of the ramp signal Ramp to be supplied from the DAC 13 to the comparator 31 is set to a voltage VOFL corresponding to the overflow level (saturation level) described with FIGS. 3A and 3B.

At a time t5 later than the time t4 when the sensing period starts, the transfer signal TRG at the Hi-level is supplied to the transfer transistor 41 to turn on the transfer transistor 41. Thus, the pixel signal VSL gradually increases from the default value $V_0$.

Then, at a time t6, a voltage of the pixel signal VSL that varies in accordance with transfer of a charge becomes higher than the voltage $V_{OFL}$ corresponding to the overflow level. In addition, the comparison result Comp is changed into the Hi-level ("1").

A state ST_D in the table of FIG. 5 indicates a state immediately after the comparison result Comp is changed into the Hi-level.

In a case where the comparison result Comp is set to be at the Hi-level ("1"), the sensing enable signal DET_ENB is also at the Hi-level. Thus, the output signal SIG_A of the AND circuit 51 becomes at the Hi-level ("1"), and at a time t7, the FD control signal GA serving as the output of the NOR circuit 53 becomes at the Hi-level ("1"). With the FD control signal GA becoming at the Hi-level ("1"), the FD coupling transistor 43 of the pixel 21 is turned on as described with reference to FIGS. 3A and 3B to cause the high sensitivity FD 40H and the low sensitivity FD 40L to be coupled to each other. That is, the sensitivity of the pixel 21 is switched from the high sensitivity for low illuminance to the low sensitivity for high illuminance.

Upon the sensitivity of the pixel 21 being switched from the high sensitivity to the low sensitivity, the voltage of the pixel signal VSL becomes lower than the voltage $V_{OFL}$ of the ramp signal Ramp again, and stabilizes at a predetermined voltage Vi that corresponds to the amount of charge. It takes a certain time from when the sensitivity of the pixel 21 switches from the high sensitivity to the low sensitivity until the voltage of the pixel signal VSL stabilizes at the predetermined voltage Vi that corresponds to the amount of charge. In order to secure a time for a voltage after the change of sensitivity to stabilize within the charge transfer period, the sensing period is set in a predetermined period in the first half of the charge transfer period.

The state ST_C in the table of FIG. 5 indicates a state immediately after the voltage of the pixel signal VSL becomes lower than the voltage $V_{OFL}$ of the ramp signal Ramp again, and the comparison result Comp is changed into the Lo-level. In this case, the FD control signal GA serving as the output of the NOR circuit 53 maintains the state before the change. Thus, the FD control signal GA remains at the Hi-level ("1"). That is, the saturation sensing circuit 32 latches and stores that the voltage of the pixel signal VSL matches the voltage $V_{OFL}$ of the ramp signal Ramp in the sensing period.

At the time t8, the sensing enable signal DET_ENB is set to be at the Lo-level ("0"), and the sensing period ends.

The state ST_B in the table of FIG. 5 indicates a state immediately after the sensing enable signal DET_ENB is changed into the Lo-level. In this case, the FD control signal GA serving as the output of the NOR circuit 53 maintains the state before the change. Thus, the FD control signal GA remains at the Hi-level ("1").

At a time t9 when the D phase period in which the signal level of the CDS process is detected starts, the ramp signal Ramp is controlled to have the default value $V_0$ again. In the D phase period, the counter 33 counts a time until a time t10 at which the voltage of the pixel signal VSL matches the voltage of the ramp signal Ramp, and the comparison result Comp changes into the Lo-level ("0").

Operation of Pixel in Case of Low Illuminance

Next, operation of the pixel 21 in a case of low illuminance will be described with reference to FIG. 6.

FIG. 6 is a timing chart illustrating an operation of the pixel 21 in a case of low illuminance.

In a case of low illuminance, because the voltage of the pixel signal VSL that varies in accordance with transfer of a charge is not higher than the voltage VOFL corresponding to the overflow level in the sensing period, the FD control signal GA does not become at the Hi-level ("1") during a period of selection of the pixel 21. Thus, as described with reference to FIGS. 3A and 3B, the FD coupling transistor 43 is not turned on. In addition, the high sensitivity is maintained. Furthermore, the transferred charge is accumulated only in the high sensitivity FD 40H.

Moreover, in the D phase period, comparison is made between the voltage of the pixel signal VSL that corresponds to the charge accumulated in the high sensitivity FD 40H and the voltage of the ramp signal Ramp. The counter 33 counts a time until a time t18 at which the comparison result Comp changes into the Lo-level ("0").

HDR Process

FIG. 7 is a diagram illustrating the HDR process performed in the counter 33.

In the counter 33, AD conversion is performed in the same AD range both in a case of the high sensitivity (high gain) for low illuminance using only the high sensitivity FD 40H and in a case of the low sensitivity (low gain) for high illuminance using both the high sensitivity FD 40H and the low sensitivity FD 40L.

The upper section of FIG. 7 is a graph indicating correspondence between the illuminance at which a pixel receives light, and pixel data after AD conversion in a fixed AD range.

Only the high sensitivity FD 40H is used in a range of pixel illuminance from zero to a BR1, which is indicated on the horizontal axis of the graph. Both the high sensitivity FD 40H and the low sensitivity FD 40L are used in a range from the BR1 to a BR2. In other words, the pixel illuminance corresponding to the BR1 is illuminance (the amount of light received) that corresponds to the overflow level at which switch is made from the high sensitivity (high gain) to the low sensitivity (low gain).

In the HDR process that the counter 33 performs, in a case where only the high sensitivity FD 40H is used, the pixel data (AD conversion value) after the AD conversion process is directly output as it is, as illustrated in the lower section of FIG. 7. In a case where both the high sensitivity FD 40H and the low sensitivity FD 40L are used, the pixel data that has been subjected to the AD conversion process is corrected with a gain ratio of (the total capacity value of the high sensitivity FD 40H and the low sensitivity FD 40L)/(the capacity value of the high sensitivity FD 40H), and the pixel data after correction is output.

In a case of the first drive control described above, the pixel 21 includes the high sensitivity FD 40H and the low sensitivity FD 40L, and a determination is made as to whether or not the high sensitivity FD 40H is saturated (whether or not the overflow level is exceeded) in the sensing period set in the first half of the charge transfer period. In a case where the high sensitivity FD 40H is determined as being saturated, the high sensitivity FD 40H and the low sensitivity FD 40L are caused to be coupled to each other, and the sensitivity of the pixel 21 is switched from the high sensitivity for low illuminance to the low sensitivity for high illuminance. On the other hand, in a case where the high sensitivity FD 40H is not saturated, the high sensitivity is maintained.

Then, the counter 33 of the counter unit 15 performs the HDR process on the basis of the saturation sensing result (saturation sensing signal), and converts into pixel data of an HDR image having an expanded dynamic range to output it.

Thus, the first drive control of the solid-state imaging device 1 enables the sensitivity to be automatically adjusted by the unit of pixel of the pixel array unit 11. In addition, on the basis of the result thereof, it is possible to output pixel data of an HDR image. That is, it is possible to generate an HDR image in an easier manner.

4. Second Drive Control

Next, a second drive control of the solid-state imaging device 1 will be described.

It should be noted that, in the following description of the second drive control, description will be made with focus being placed on portions differing from the first drive control described above.

FIG. 8 is a timing chart illustrating an operation of the pixel 21 in the second drive control in a case of high illuminance.

FIG. 8 corresponds to the timing chart of FIG. 4 concerning the first drive control. The times t1 to t10 in FIG. 4 correspond to times t21 to t30 in FIG. 8.

FIG. 9 is a timing chart illustrating an operation of the pixel 21 in the second drive control in a case of low illuminance.

FIG. 9 corresponds to the timing chart of FIG. 6 concerning the first drive control. The times t11 to t18 in FIG. 6 correspond to times t41 to t48 in FIG. 9.

In a case of the first drive control that has been described with reference to FIGS. 4 and 6, in each of the P phase period and the D phase period, the ramp signal Ramp has a voltage signal sloped downward from the default value $V_0$ toward the voltage $V_{OFL}$ in accordance with elapsed time. Thus, it is necessary for the DAC 13 to control the ramp signal Ramp to largely change into the default value $V_0$ again at the time t9 and the time t17 when the D phase period starts.

On the other hand, the second drive control in FIGS. 8 and 9 differs in that the ramp signal Ramp in the D phase period has a voltage signal sloped upward from a voltage $V_{BL}$ close to the voltage $V_{OFL}$ toward the default value $V_0$ in accordance with elapsed time. The voltage $V_{BL}$ higher than the voltage $V_{OFL}$ by a predetermined voltage is set immediately before times t29 and t47 when the D phase period starts. One reason for this is to ensure that matching of the voltage of the pixel signal VSL and the voltage of the ramp signal Ramp is detected in the D phase period.

In a case of the first drive control, the counter 33 counts a comparison period in which the comparison result Comp changes from the Hi-level to the Lo-level. In a case of the second drive control, the counter 33 counts a comparison period in which the comparison result Comp changes from the Lo-level to the Hi-level.

Other drives in the second drive control are similar to those in the first drive control described above.

As described above, in a case of the second drive control, the ramp signal Ramp at the time of performing counting in the D phase period is set such that a voltage signal thereof is sloped upward from the voltage $V_{BL}$ close to the voltage $V_{OFL}$ toward the default value $V_0$. This eliminates the necessity of largely changing the voltage of the ramp signal Ramp from the voltage $V_{OFL}$ to the default value $V_0$ immediately before the D phase period. Thus, it is possible to easily perform control. In addition, it is possible to reduce a drive period.

It should be noted that, in the second drive control, the ramp signal Ramp during the P phase period may be set to have a voltage signal sloped upward, as with the ramp signal Ramp in the D phase period.

5. Third Drive Control

Next, a third drive control of the solid-state imaging device 1 will be described.

It should be noted that, in the following description of the third drive control, description will be made with focus being placed on portions differing from the second drive control described above.

FIG. 10 is a timing chart illustrating an operation of the pixel 21 in the third drive control in a case of high illuminance. FIG. 10 corresponds to the timing chart in FIG. 8 concerning the second drive control.

The third drive control in a case of high illuminance is equal to the second drive control illustrated in FIG. 9. Thus, description thereof will not be repeated.

The third drive control in a case of low illuminance sets two sensing periods to sense the sensitivity of the pixel 21 switching from the high sensitivity for low illuminance to the low sensitivity for high illuminance, the two sensing periods being the first haft of the charge transfer period and the first half of the D phase period. That is, a sensing period set in the first half of the charge transfer period is set as a first sensing period. A sensing period set in the first half of the D phase period is set as a second sensing period. In this case, the first sensing period is the same as the second drive control. In the third drive control, the second sensing period is additionally provided.

In the first sensing period, the solid-state imaging device 1 senses an overflow in a case of high illuminance. In the second sensing period, the solid-state imaging device 1 senses an overflow in a case of middle illuminance between the high illuminance and the low illuminance.

Operations at times t61 to t66 in the timing chart of FIG. 10 are similar to operations at times t41 to t46 in the timing chart of FIG. 9. Thus, description thereof will not be repeated.

Immediately before a time t67, a voltage of the ramp signal Ramp is set to be a voltage $V_{BL}$ higher than the voltage $V_{OFL}$ by a predetermine voltage. Then, the timing controller 19 changes (sets) the sensing enable signal DET_ENB to be at the Hi-level ("1") again, and starts the second sensing period.

Furthermore, upon the voltage of the pixel signal VSL matching the voltage of the ramp signal Ramp at a time t68 in the second sensing period, the comparison result Comp is changed into the Hi-level ("1").

Then, at a time t69, the FD control signal GA serving as the output of the NOR circuit 53 becomes at the Hi-level ("1"). With the FD control signal GA becoming at the Hi-level ("1"), the FD coupling transistor 43 of the pixel 21 turns on to cause the high sensitivity FD 40H and the low sensitivity FD 40L to be coupled to each other. That is, the sensitivity of the pixel 21 is switched from the high sensitivity for low illuminance to the low sensitivity for high illuminance. This makes the comparison result Comp changed into the Lo-level again.

At a time t70, the timing controller 19 changes (sets) the sensing enable signal DET_ENB into the Lo-level ("0"). This makes the second sensing period ended.

Furthermore, at a time t71 on and after the second sensing period, the voltage of the pixel signal VSL matches the voltage of the ramp signal Ramp again. The comparison result Comp is changed into the Hi-level ("1").

In this third drive control, in a case where the illuminance at the pixel 21 corresponds to the middle illuminance, matching of voltages of the pixel signal VSL and the ramp signal Ramp is detected twice as described above. Thus, it is necessary for the counter unit 15 to have two counters 33A and 33B for one comparator 31 on the same pixel column as illustrated, for example, in FIG. 11.

FIG. 11 is a diagram illustrating an example of a configuration of the counter unit 15 in a case where the third drive control is performed.

It should be noted that, in FIG. 11, the comparator 31 and the saturation sensing circuit 32 on the same pixel column have the same configurations as those illustrated in FIG. 2.

The counter unit 15 in FIG. 11 includes two counters 33A and 33B for one comparator 31 on the same pixel column. The counter unit 15 also includes a switch circuit 71 between the counter 33A and the comparator 31.

The counters 33A and 33B are identical to each other. In the P phase period, the counters 33A and 33B perform down-count only during a time when the comparison result Comp at the Hi-level is supplied. In the D phase period, the counters 33A and 33B perform up-count only during a time when the comparison result Comp at the Lo-level is supplied.

The counter 33A performs up-count from the beginning of the up-count until the voltage of the pixel signal VSL and the voltage of the ramp signal Ramp match with each other during the second sensing period. The switch circuit 71 turns off the coupling upon detecting the matching of the voltage of the pixel signal VSL and the voltage of the ramp signal Ramp, on the basis of the saturation sensing signal.

The counter 33B performs up-count from the start of up-count until the voltage of the pixel signal VSL and the voltage of the ramp signal Ramp match after the end of the second sensing period.

In other words, the counter 33A computes a count value in a case where only the high sensitivity FD 40H for low illuminance is used. The counter 33B computes a count value in a case where the high sensitivity FD 40H for the high illuminance and the low sensitivity FD 40L are used.

As described above, in the third drive control, the illuminance (the amount of light received) at the pixel 21 is divided into three stages: the low illuminance, the middle illuminance, and the high illuminance. In a case where the pixel illuminance corresponds to the middle illuminance, the solid-state imaging device 1 detects that the voltage of the pixel signal VSL and the voltage of the ramp signal Ramp match, the detection being made twice in total in the D phase period: one in the second sensing period; and the other in the period thereafter. In a case where the pixel illuminance corresponds to the high illuminance, the solid-state imaging device 1 detects, only in the first sensing period of the charge transfer period, that the voltage of the pixel signal VSL and the voltage of the ramp signal Ramp match. In a case where the pixel illuminance corresponds to the low illuminance, the solid-state imaging device 1 makes the detection only in the rest of the D phase period after the second sensing period.

It should be noted that the configuration of the solid-state imaging device 1 in a case of performing the third drive control is not limited to this. For example, it may be possible to employ a configuration in which only one counter 33 is provided for the same pixel column, and this counter 33 performs counting for both the low illuminance and the high illuminance. Alternatively, it may be possible to employ a configuration in which the comparator 31 and the saturation sensing circuit 32 are provided in parallel for each of two counters 33A and 33B.

HDR Process

FIG. 12 is a diagram illustrating an HDR process in the third drive control.

As illustrated in the graph in the upper section of FIG. 12, the pixel 21 is able to receive light of which illuminance ranges from zero to BRc. Of the illuminance, the low illuminance from zero to Bra is detected using only the high sensitivity FD 40H. In addition, the middle illuminance from BRa to BRb is detected in a state of using only the high sensitivity FD 40H and also detected in a state of using both the high sensitivity FD 40H and the low sensitivity FD 40L. For the high illuminance from BRb to BRc, illuminance is detected only in a state of using the high sensitivity FD 40H and the low sensitivity FD 40L.

For the middle illuminance from BRa to BRb, it is possible to obtain two pieces of detection results. These results are synthesized at a predetermined synthesizing ratio such as 3:7 or 5:5, and are outputted as pixel data of an HDR image.

That is, in a case of the low illuminance from zero to BRc, the counter 33 directly outputs the pixel data that has been subjected to the AD conversion process. In a case of the middle illuminance from BRa to BRb, the counter 33 outputs the synthesized pixel data obtained by synthesizing the pixel data that has been subjected to the AD conversion process with the corrected pixel data corrected using a gain ratio. In a case of the high illuminance from BRb to BRc, the counter 33 corrects, using a gain ratio, the pixel data that has been subjected to the AD conversion process to output the corrected pixel data.

In a case of the method of generating pixel data of an HDR image with two stages including the low illuminance and the high illuminance, which has been described with reference to FIG. 7, detection methods are suddenly switched at a boundary between the low illuminance and the high illuminance. This may create a difference in level in the pixel data around the boundary between them.

In the third drive control, the middle illuminance is set between the low illuminance and the high illuminance. Furthermore, detection is made using both the case where only the high sensitivity FD 40H for low illuminance is used and the case where the high sensitivity FD 40H for high illuminance and the low sensitivity FD 40L are used. Thus, it is possible to generate pixel data in a manner that the difference in level is taken into consideration.

6. Other Circuit Configuration of Pixel

The circuit configuration of the pixel 21 is not limited to the configuration that has been described with reference to FIG. 2. Other configurations may be taken.

FIG. 13 illustrates another circuit configuration of the pixel 21.

In FIG. 12, portions that correspond to those in FIG. 2 are denoted as the same reference characters, and description of these portions will not be repeated.

The pixel circuit in FIG. 2 and the pixel circuit in FIG. 13 are identical in that the FD coupling transistor 43 is disposed between the high sensitivity FD 40H and the low sensitivity FD 40L, and the high sensitivity FD 40H is disposed between the transfer transistor 41 and the amplification transistor 44.

In the pixel circuit in FIG. 2, however, the high sensitivity FD 40H is coupled to a predetermined reset voltage Vrst via the first reset transistor 42A and the second reset transistor 42B. On the other hand, in the pixel circuit in FIG. 13, the high sensitivity FD 40H is coupled to the predetermined reset voltage Vrst only via the second reset transistor 42B. The first reset transistor 42A is coupled between the high sensitivity FD 40H and the low sensitivity FD 40L. The low sensitivity FD 40L is coupled to the ground.

FIG. 14 is still another circuit configuration of the pixel 21. The circuit configuration illustrated employs a shared pixel structure in which a plurality of pixels shares two FDs, which are the high sensitivity FD 40H and the low sensitivity FD 40L, the first reset transistor 42A, the second reset transistor 42B, the FD coupling transistor 43, the amplification transistor 44, and the selection transistor 45.

In a case of employing the shared pixel structure, only the photodiode PD and the transfer transistor 41 are each disposed for each of the pixels 21, as illustrated in FIG. 14. Two FDs, which are a high sensitivity FD 40H and a low sensitivity FD 40L, a first reset transistor 42A, a second reset transistor 42B, an FD coupling transistor 43, an amplification transistor 44, and a selection transistor 45 are each provided for n-number of pixels 21 constituting a unit of sharing. The two FDs, the first reset transistor 42A, the second reset transistor 42B, the FD coupling transistor 43, the amplification transistor 44, and the selection transistor 45 that are used by the plurality of pixels in a shared manner are disposed, for example, in a region of any of the plurality of pixels serving as the unit of sharing or in a region between them.

It should be noted that, while the configuration in FIG. 14 is obtained by modifying the circuit configuration in FIG. 2 into the shared pixel structure, it is also possible to modify the circuit configuration in FIG. 13 into the shared pixel structure in a similar manner.

The solid-state imaging device 1 using the shared pixel structure simultaneously transfers, to FDs, charges accumulated in the photodiodes PD of two or more pixels 21 that use the FDs in a sharing manner. This makes it possible to perform FD addition in which pixel signals of the plurality of pixels are added using the FDs. However, a possibility of reaching the overflow level is high.

Thus, the solid-state imaging device 1 appropriately varies the overflow level (voltage $V_{OFL}$), for example, in accordance with various types of operating modes such as an FD addition mode in which pixel signals of a plurality of pixels are added using an FD or a single pixel mode in which a pixel signal is outputted on a pixel-by-pixel basis, or in accordance with a shutter speed or other setting values at the time of imaging.

7. Conclusion

The solid-state imaging device 1 described above includes: two FDs, the high sensitivity FD 40H (first charge holder) and the low sensitivity FD 40L (second charge holder), which hold a charge generated in the photodiode PD; the FD coupling transistor 43 that controls (turns on and off) coupling of the high sensitivity FD 40H and the low sensitivity FD 40L; and the saturation sensing circuit 32 serving as a control circuit that performs control to couple the high sensitivity FD 40H and the low sensitivity FD 40L when a voltage of the pixel signal VSL outputted from the pixel 21 matches a voltage of the ramp signal Ramp of which level varies in accordance with elapsed time.

In the charge transfer period, a charge accumulated in the photodiode PD is first transferred to the high sensitivity FD 40H. Then, when a voltage of the pixel signal VSL matches a voltage of the ramp signal Ramp that is set to the voltage $V_{OFL}$ corresponding to the overflow level of the high sensitivity FD 40H, and saturation of the high sensitivity FD 40H is sensed, coupling between the high sensitivity FD 40H and the low sensitivity FD 40L is turned on. In addition, the charge generated in the photodiode PD is accumulated in both the high sensitivity FD 40H and the low sensitivity FD 40L.

That is, the charge is held in the high sensitivity FD 40H until the voltage of the pixel signal VSL is detected to match the voltage of the ramp signal Ramp. After matching is detected, the charge is held in both the high sensitivity FD 40H and the low sensitivity FD 40L.

Thus, according to the solid-state imaging device 1, it is possible to automatically adjust sensitivity for each pixel in accordance with the amount of light received to output pixel data of an HDR image. That is, it is possible to generate an HDR image in an easier manner.

It is possible to generate an HDR image through imaging once, as compared with a typical method of generating an HDR image, such as a method of synthesizing a plurality of images with different imaging timings, or a method of receiving light in a manner such that sensitivity at a pixel is caused to differ in the pixel array unit. Thus, it is possible to avoid a reduction in the frame rate and to reduce power consumption as well. Furthermore, it is possible to generate an HDR image through imaging once. Thus, an influence is small for a subject in motion. Subsequent processing such as motion detection or spatial filtering is not necessary as well.

8. Example of Application to Electronic Apparatus

Application of the present technology is not limited to the solid-state imaging device. That is, the present technology is applicable to a general electronic apparatus using a solid-state imaging device as an image capturing unit (photoelectric converter), the general electronic apparatus including: an imaging unit such as a digital still camera or a video camera; a mobile terminal apparatus having an imaging function; and a copy machine using the solid-state imaging device as an image reading unit. The solid-state imaging device may be in the form in which the device is formed as one chip, or may be in the module-like form having an imaging function, in which an imaging section and a signal processing unit or an optical system are packaged together.

FIG. 15 is a block diagram illustrating an example of a configuration of an imaging unit serving as an electronic apparatus to which the present technology is applied.

An imaging unit 100 in FIG. 15 includes an optical unit 101 including, for example, a group of lenses, a solid-state imaging device (imaging device) 102 that employs the configuration of the solid-state imaging device 1 in FIG. 1, and a DSP (Digital Signal Processor) circuit 103 serving as a camera-signal processing circuit. In addition, the imaging unit 100 also includes a frame memory 104, a displaying unit 105, a recording unit 106, an operation unit 107, and a power supply unit 108. The DSP circuit 103, the frame memory 104, the displaying unit 105, the recording unit 106, the operation unit 107, and the power supply unit 108 are coupled to each other via a bus line 109.

The optical unit 101 captures light (image light) coming from a subject to form an image on an imaging plane of the solid-state imaging device 102. The solid-state imaging device 102 converts the amount of incoming light of the image formed on the imaging plane by the optical unit 101 into an electrical signal on a pixel basis, and outputs it as a pixel signal. As the solid-state imaging device 102, the solid-state imaging device 1 in FIG. 1 is provided. That is, the two FDs, the high sensitivity FD 40H and the low sensitivity FD 40L, are provided. The high sensitivity FD 40H and the low sensitivity FD 40L are coupled in accordance with the amount of received light to automatically switch the sensitivity. This makes it possible to use the solid-state imaging device that outputs an HDR image having an expanded dynamic range.

The displaying unit 105 includes, for example, a panel-type display unit such as a liquid crystal panel or an organic EL (Electro Luminescence) panel, and displays a moving image or a still image imaged by the solid-state imaging device 102. The recording unit 106 records the moving image or the still image imaged by the solid-state imaging device 102, in a recording medium such as a hard disk or a semiconductor memory.

The operation unit 107 gives an operational instruction concerning various functions of the imaging unit 100, under operations made by a user. The power supply unit 108 supplies, on an as-necessary basis, power supply serving as operational power supply for the DSP circuit 103, the frame memory 104, the displaying unit 105, the recording unit 106, and the operation unit 107, to these targets of supply.

As described above, by using the solid-state imaging device 1 described above as the solid-state imaging device 102, it is possible to easily generate an HDR image having an expanded dynamic range. Thus, it is also possible to improve quality of images captured by the imaging unit 100 such as a video camera, a digital still camera, or a camera module for mobile apparatuses such as a mobile phone apparatus.

Example of Using Image Sensor

FIG. 16 is a diagram illustrating an example of use in a case where the solid-state imaging device 1 described above is used as an image sensor.

The image sensor can be used, for example, in various cases for sensing light such as visible light, infrared light, ultraviolet light, or X-rays as described below.

- Apparatuses for capturing images for viewing purposes, such as a digital camera or a portable apparatus with a camera function
- Apparatuses used for transport purposes, such as vehicle sensors for taking images of the front, rear, surrounding, inside, etc., of automobiles, monitoring cameras for monitoring traveling vehicles and roads, or distance sensors for measuring distance between vehicles, etc., for the purpose of safe driving such as automatic stoppage, recognition of the state of the driver, etc.
- Apparatuses used in home appliances such as TVs, refrigerators, or air conditioners to capture a user's gesture and perform apparatus operations in accordance with the gesture
- Apparatuses used for medical and healthcare purposes, such as endoscopes or apparatuses that perform angiography by receiving infrared light
- Apparatuses used for security purposes, such as surveillance cameras for crime prevention or cameras for person authentication
- Apparatuses used for cosmetic purposes, such as skin measuring instruments for taking skin images or microscopes for taking scalp images
- Apparatuses used for sports purposes, such as action cameras or wearable cameras for sports applications
- Apparatuses used for agricultural purposes, such as cameras for monitoring the states of fields and crops 9. Application Example to In-Vivo Information Acquisition System It is possible to apply a technique (the present technology) according to the present disclosure to various products as described above. For example, the technique according to the present disclosure may be applied to an in-vivo information acquisition system of a patient using a capsule type endoscope.

FIG. 17 is a block diagram depicting an example of a schematic configuration of an in-vivo information acquisition system of a patient using a capsule type endoscope, to which the technology according to an embodiment of the present disclosure (present technology) can be applied.

The in-vivo information acquisition system 10001 includes a capsule type endoscope 10100 and an external controlling apparatus 10200.

The capsule type endoscope 10100 is swallowed by a patient at the time of inspection. The capsule type endoscope 10100 has an image pickup function and a wireless communication function and successively picks up an image of the inside of an organ such as the stomach or an intestine (hereinafter referred to as in-vivo image) at predetermined intervals while it moves inside of the organ by peristaltic motion for a period of time until it is naturally discharged from the patient. Then, the capsule type endoscope 10100 successively transmits information of the in-vivo image to the external controlling apparatus 10200 outside the body by wireless transmission.

The external controlling apparatus 10200 integrally controls operation of the in-vivo information acquisition system 10001. Further, the external controlling apparatus 10200 receives information of an in-vivo image transmitted thereto from the capsule type endoscope 10100 and generates image data for displaying the in-vivo image on a display apparatus (not depicted) on the basis of the received information of the in-vivo image.

In the in-vivo information acquisition system 10001, an in-vivo image imaged a state of the inside of the body of a patient can be acquired at any time in this manner for a period of time until the capsule type endoscope 10100 is discharged after it is swallowed.

A configuration and functions of the capsule type endoscope 10100 and the external controlling apparatus 10200 are described in more detail below.

The capsule type endoscope 10100 includes a housing 10101 of the capsule type, in which a light source unit 10111, an image pickup unit 10112, an image processing unit 10113, a wireless communication unit 10114, a power feeding unit 10115, a power supply unit 10116 and a control unit 10117 are accommodated.

The light source unit 10111 includes a light source such as, for example, a light emitting diode (LED) and irradiates light on an image pickup field-of-view of the image pickup unit 10112.

The image pickup unit 10112 includes an image pickup element and an optical system including a plurality of lenses provided at a preceding stage to the image pickup element. Reflected light (hereinafter referred to as observation light) of light irradiated on a body tissue which is an observation target is condensed by the optical system and introduced into the image pickup element. In the image pickup unit 10112, the incident observation light is photoelectrically converted by the image pickup element, by which an image signal corresponding to the observation light is generated. The image signal generated by the image pickup unit 10112 is provided to the image processing unit 10113.

The image processing unit 10113 includes a processor such as a central processing unit (CPU) or a graphics processing unit (GPU) and performs various signal processes for an image signal generated by the image pickup unit 10112. The image processing unit 10113 provides the image signal for which the signal processes have been performed thereby as RAW data to the wireless communication unit 10114.

The wireless communication unit 10114 performs a predetermined process such as a modulation process for the image signal for which the signal processes have been performed by the image processing unit 10113 and transmits the resulting image signal to the external controlling apparatus 10200 through an antenna 10114A. Further, the wireless communication unit 10114 receives a control signal relating to driving control of the capsule type endoscope 10100 from the external controlling apparatus 10200 through the antenna 10114A. The wireless communication unit 10114 provides the control signal received from the external controlling apparatus 10200 to the control unit 10117.

The power feeding unit 10115 includes an antenna coil for power reception, a power regeneration circuit for regenerating electric power from current generated in the antenna coil, a voltage booster circuit and so forth. The power feeding unit 10115 generates electric power using the principle of non-contact charging.

The power supply unit 10116 includes a secondary battery and stores electric power generated by the power feeding unit 10115. In FIG. 17, in order to avoid complicated illustration, an arrow mark indicative of a supply destination of electric power from the power supply unit 10116 and so forth are omitted. However, electric power stored in the power supply unit 10116 is supplied to and can be used to drive the light source unit 10111, the image pickup unit 10112, the image processing unit 10113, the wireless communication unit 10114 and the control unit 10117.

The control unit 10117 includes a processor such as a CPU and suitably controls driving of the light source unit 10111, the image pickup unit 10112, the image processing unit 10113, the wireless communication unit 10114 and the power feeding unit 10115 in accordance with a control signal transmitted thereto from the external controlling apparatus 10200.

The external controlling apparatus 10200 includes a processor such as a CPU or a GPU, a microcomputer, a control board or the like in which a processor and a storage element such as a memory are mixedly incorporated. The external controlling apparatus 10200 transmits a control signal to the control unit 10117 of the capsule type endoscope 10100 through an antenna 10200A to control operation of the capsule type endoscope 10100. In the capsule type endoscope 10100, an irradiation condition of light upon an observation target of the light source unit 10111 can be changed, for example, in accordance with a control signal from the external controlling apparatus 10200. Further, an image pickup condition (for example, a frame rate, an exposure value or the like of the image pickup unit 10112) can be changed in accordance with a control signal from the external controlling apparatus 10200. Further, the substance of processing by the image processing unit 10113 or a condition for transmitting an image signal from the wireless communication unit 10114 (for example, a transmission interval, a transmission image number or the like) may be changed in accordance with a control signal from the external controlling apparatus 10200.

Further, the external controlling apparatus 10200 performs various image processes for an image signal transmitted thereto from the capsule type endoscope 10100 to generate image data for displaying a picked up in-vivo image on the display apparatus. As the image processes, various signal processes can be performed such as, for example, a development process (demosaic process), an image quality improving process (bandwidth enhancement process, a super-resolution process, a noise reduction (NR) process and/or image stabilization process) and/or an enlargement process (electronic zooming process). The external controlling apparatus 10200 controls driving of the display apparatus to cause the display apparatus to display a picked up in-vivo image on the basis of generated image data. Alternatively, the external controlling apparatus 10200 may also control a recording apparatus (not depicted) to record generated image data or control a printing apparatus (not depicted) to output generated image data by printing.

An example of the in-vivo information acquisition system to which the technique according to the present disclosure can be applied is described above. The technique according to the present disclosure may be applied to the image pickup unit 10112 out of the configuration described above. Specifically, it is possible to apply the solid-state imaging device 1 described above as the image pickup unit 10112. By applying the technique according to the present disclosure to the image pickup unit 10112, it is possible to achieve a further reduction in size of the capsule type endoscope 10100, making it possible to further reduce a burden imposed on a patient. In addition, it is possible to obtain a clear surgical region image that has an expanded dynamic range while achieving the size reduction of the capsule type endoscope 10100, making it possible to improve inspection accuracy.

10. Application Example to Endoscopic Surgery System

A technique according to the present disclosure may be applied to, for example, an endoscopic surgery system.

FIG. 18 is a view depicting an example of a schematic configuration of an endoscopic surgery system to which the technology according to an embodiment of the present disclosure (present technology) can be applied.

In FIG. 18, a state is illustrated in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy treatment tool 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body lumen of the patient 11132, and a camera head 11102 connected to a proximal end of the lens barrel 11101. In the example depicted, the endoscope 11100 is depicted which includes as a hard mirror having the lens barrel 11101 of the hard type. However, the endoscope 11100 may otherwise be included as a soft mirror having the lens barrel 11101 of the soft type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body lumen of the patient 11132 through the objective lens. It is to be noted that the endoscope 11100 may be a direct view mirror or may be a perspective view mirror or a side view mirror.

An optical system and an image pickup element are provided in the inside of the camera head 11102 such that reflected light (observation light) from the observation target is condensed on the image pickup element by the optical system. The observation light is photoelectrically converted by the image pickup element to generate an electric signal corresponding to the observation light, namely, an image signal corresponding to an observation image. The image signal is transmitted as RAW data to a CCU 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy treatment tool 11112 for cautery or incision of a tissue, sealing of a blood vessel or the like. A pneumoperitoneum apparatus 11206 feeds gas into a body lumen of the patient 11132 through the pneumoperitoneum tube 11111 to inflate the body lumen in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

FIG. 19 is a block diagram depicting an example of a functional configuration of the camera head 11102 and the CCU 11201 depicted in FIG. 18.

The camera head 11102 includes a lens unit 11401, an image pickup unit 11402, a driving unit 11403, a communication unit 11404 and a camera head controlling unit 11405. The CCU 11201 includes a communication unit 11411, an image processing unit 11412 and a control unit 11413. The camera head 11102 and the CCU 11201 are connected for communication to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The number of image pickup elements which is included by the image pickup unit 11402 may be one (single-plate type) or a plural number (multi-plate type). Where the image pickup unit 11402 is configured as that of the multi-plate type, for example, image signals corresponding to respective R, G and B are generated by the image pickup elements, and the image signals may be synthesized to obtain a color image. The image pickup unit 11402 may also be configured so as to have a pair of image pickup elements for acquiring respective image signals for the right eye and the left eye ready for three dimensional (3D) display. If 3D display is performed, then the depth of a living body tissue in a surgical region can be comprehended more accurately by the surgeon 11131. It is to be noted that, where the image pickup unit 11402 is configured as that of stereoscopic type, a plurality of systems of lens units 11401 are provided corresponding to the individual image pickup elements.

Further, the image pickup unit 11402 may not necessarily be provided on the camera head 11102. For example, the image pickup unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the image pickup unit 11402 can be adjusted suitably.

The communication unit 11404 includes a communication apparatus for transmitting and receiving various kinds of information to and from the CCU 11201. The communication unit 11404 transmits an image signal acquired from the image pickup unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to image pickup conditions such as, for example, information that a frame rate of a picked up image is designated, information that an exposure value upon image picking up is designated and/or information that a magnification and a focal point of a picked up image are designated.

It is to be noted that the image pickup conditions such as the frame rate, exposure value, magnification or focal point may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Further, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Further, the control unit 11413 controls, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy treatment tool 11112 is used and so forth by detecting the shape, color and so forth of edges of objects included in a picked up image. The control unit 11413 may cause, when it controls the display apparatus 11202 to display a picked up image, various kinds of surgery supporting information to be displayed in an overlapping manner with an image of the surgical region using a result of the recognition. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the example depicted, communication is performed by wired communication using the transmission cable 11400, the communication between the camera head 11102 and the CCU 11201 may be performed by wireless communication.

An example of the endoscopic surgery system to which the technique according to the present disclosure can be applied is described above. The technique according to the present disclosure may be applied to the image pickup unit 11402 of the camera head 11102 out of the configuration described above. Specifically, it is possible to apply the solid-state imaging device 1 described above as the image pickup unit 11402. By applying the technique according to the present disclosure to the image pickup unit 11402, it is possible to obtain a clear surgical region image that has an expanded dynamic range while achieving a size reduction of the camera head 11102.

It should be noted that, although the endoscopic surgery system has been described here as one example, the technique according to the present disclosure may be applied, for example, to a microsurgery system or other systems.

11. Application Example to Mobile Body

Further, a technique according to the present disclosure may be achieved in the form of an apparatus to be mounted to a mobile body of any kind. Examples of the mobile body include an automobile, an electric vehicle, a hybrid electric vehicle, a motorcycle, a bicycle, a personal mobility, an airplane, a drone, a vessel, and a robot.

FIG. 20 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 20, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 20, an audio speaker 12061, a display section 12062, and an instrument panel 12063 are illustrated as the output device. The display section 12062 may, for example, include at least one of an on-board display and a head-up display.

FIG. 21 is a diagram depicting an example of the installation position of the imaging section 12031.

In FIG. 21, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 21 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technique according to the present disclosure can be applied is described above. The technique according to the present disclosure may be applied to the imaging section 12031 out of the configuration described above. Specifically, it is possible to apply the solid-state imaging device 1 described above as the imaging section 12031. By applying the technique according to the present disclosure to the imaging section 12031, it is possible to obtain an imaged image that has an expanded dynamic range and that is easier to see, while achieving a size reduction. In addition, using the thus-obtained imaged image makes it possible to reduce fatigue of a driver or increase safety of the driver or a vehicle.

Embodiments according to the present technology are not limited to the embodiments described above, and various modifications are possible within the scope of the gist of the present technology.

For example, it is possible to employ an embodiment in which all of or a portion of the embodiments described above are combined as appropriate.

It should be noted that the effects described in the present description are merely examples, and are not given for the purpose of limitation. The present technology is able to provide effects other than those described in the present description.

It should be noted that it is possible for the present technology to have configurations described below.

(1)

A solid-state imaging device including:

first and second charge holders that hold a charge generated in a photoelectric converter of a pixel;

a coupling transistor that turns on and off coupling of the first charge holder and the second charge holder; and a control circuit that performs a control that couples the first charge holder and the second charge holder, when a voltage of a pixel signal outputted from the pixel matches a voltage of a ramp signal, a level of the ramp signal varying in accordance with elapsed time.

(2)

The solid-state imaging device according to (1) described above, in which the first charge holder has a charge capacity formed smaller than a charge capacity of the second charge holder, and the first charge holder is configured to hold the charge until the match of the voltage of the pixel signal and the voltage of the ramp signal is detected.

(3)

The solid-state imaging device according to (1) or (2) described above, further including a comparator that compares the voltage of the pixel signal and the voltage of the ramp signal, in which the control circuit sets a portion of a charge transfer period to be a first sensing period, and detects the match of the voltages on a basis of a comparison result by the comparator, the charge transfer period being a period in which the charge generated in the photoelectric converter is transferred to the first charge holder, the first sensing period being a period in which the match of the voltage of the pixel signal and the voltage of the ramp signal is detected.

(4)

The solid-state imaging device according to any one of (1) to (3) described above, further including a DAC that sets the voltage of the ramp signal to be a voltage corresponding to a saturation level of the first charge holder.

(5)

The solid-state imaging device according to (4) described above, in which the DAC sets, in a first half of the charge transfer period, the voltage of the ramp signal to be the voltage corresponding to the saturation level of the first charge holder.

(6)

The solid-state imaging device according to (4) or (5) described above, in which the DAC varies the voltage corresponding to the saturation level of the first charge holder in accordance with an operating mode.

(7)

The solid-state imaging device according to any one of (3) to (6) described above, in which, when the match of the voltages is detected in the first sensing period, the control circuit latches and stores a sensing result that indicates the match.

(8)

The solid-state imaging device according to (7) described above, in which the control circuit resets the sensing result, before the charge generated in the photoelectric converter is transferred to the first charge holder.

(9)

The solid-state imaging device according to (7) or (8) described above, in which the control circuit outputs, to a counter, the sensing result indicating that the voltage of the pixel signal matches the voltage of the ramp signal, the counter counting a time until which the voltage of the pixel signal and the voltage of the ramp signal are matched.

(10)

The solid-state imaging device according to (9) described above, further including a computing unit that computes pixel data, in a case where the sensing result indicating that the voltage of the pixel signal matches the voltage of the ramp signal is supplied, the pixel data being corrected in accordance with a gain ratio of the first charge holder and the second charge holder.

(11)

The solid-state imaging device according to (10) described above, in which the computing unit includes the counter or a signal processing unit.

(12)

The solid-state imaging device according to (3) described above, in which, in addition to the first sensing period, the control circuit sets a portion of a D phase period to be a second sensing period in which the match of the voltages is detected, and performs the control that couples the first charge holder and the second charge holder when the match of the voltages is detected.

(13)

The solid-state imaging device according to (12) described above, further including a computing unit that, in a case where the match of the voltages is detected in the second sensing period, synthesizes pixel data that uses only the first charge holder with pixel data that is corrected in accordance with the gain ratio of the first charge holder and the second charge holder; and computes pixel data that is after the synthesizing.

(14)

The solid-state imaging device according to (13) described above, further including an output unit that:

outputs the pixel data that is corrected in accordance with the gain ratio of the first charge holder and the second charge holder, in a case where the match of the voltages is detected in the first sensing period;

outputs the pixel data that is after the synthesizing, in a case where the match of the voltages is detected in the second sensing period; and outputs the pixel data that uses only the first charge holder, in a case where the match of the voltages is not detected in the first sensing period or in the second sensing period.

(15)

The solid-state imaging device according to any one of (1) to (11) described above, further including:

a counter that calculates pixel data on a basis of a time until which the voltage of the pixel signal outputted from the pixel matches the voltage of the ramp signal; and an output unit that, as for the pixel data that uses only the first charge holder, outputs the pixel data that uses only the first charge holder as it is, and, as for the pixel data that uses both the first charge holder and the second charge holder, outputs corrected pixel data in which the pixel data is corrected in accordance with a gain ratio of the first charge holder and the second charge holder.

(16)

The solid-state imaging device according to any one of (1) to (15) described above, further including:

a first reset transistor that resets the charge of the first charge holder; and a second reset transistor that resets the charge of the second charge holder, in which the first charge holder has a charge capacity formed smaller than a charge capacity of the second charge holder, and the first charge holder is coupled to a predetermined reset voltage via the first and the second reset transistors.

(17)

The solid-state imaging device according to any one of (1) to (15) described above, further including:

a first reset transistor that resets the charge of the first charge holder; and a second reset transistor that resets the charge of the second charge holder, in which the first charge holder has a charge capacity formed smaller than a charge capacity of the second charge holder, and the first charge holder is coupled to a predetermined reset voltage via the first reset transistor.

(18)

The solid-state imaging device according to any one of (1) to (17) described above, in which the first charge holder, the second charge holder, and the coupling transistor are configured to be shared by a plurality of the pixels.

(19)

A method of controlling a solid-state imaging device, the solid-state imaging device including:

first and second charge holders that hold a charge generated in a photoelectric converter of a pixel; a coupling transistor that turns on and off coupling of the first charge holder and the second charge holder; and a control circuit that controls the coupling transistor, the method including performing, with the control circuit, a control that couples the first charge holder and the second charge holder, when a voltage of a pixel signal outputted from the pixel matches a voltage of a ramp signal, a level of the ramp signal varying in accordance with elapsed time.

(20)

An electronic apparatus with a solid-state imaging device, the solid-state imaging device including:

first and second charge holders that hold a charge generated in a photoelectric converter of a pixel;

a coupling transistor that turns on and off coupling of the first charge holder and the second charge holder; and a control circuit that performs a control that couples the first charge holder and the second charge holder, when a voltage of a pixel signal outputted from the pixel matches a voltage of a ramp signal, a level of the ramp signal varying in accordance with elapsed time.

DESCRIPTION OF REFERENCE CHARACTERS

1 solid-state imaging device, 11 pixel array unit, 13 DAC, 14 comparing unit, 15 counter unit, 17 signal processing unit, 18 output unit, 21 pixel, PD photodiode, 23 first vertical signal line, 24 second vertical signal line, 31 comparator, 32 saturation sensing circuit, 33 (33A, 33B) counter, 41 transfer transistor, 42A first reset transistor, 42B second reset transistor, FD$_H$ high sensitivity, FD$_L$ low sensitivity, 43 FD coupling transistor, 44 amplification transistor, 45 selection transistor, 51 AND circuit, 52, 53 NOR circuit, 71 switch circuit, 100 imaging unit, 102 solid-state imaging device

The invention claimed is:

1. A solid-state imaging device, comprising:
a pixel configured to output a pixel signal, wherein the pixel includes:
 a photoelectric converter configured to generate a charge;
 a first charge holder;
 a second charge holder, wherein
  the first charge holder and the second charge holder are configured to hold the charge generated in the photoelectric converter of the pixel,
  the first charge holder has a charge capacity smaller than a charge capacity of the second charge holder, and
  the first charge holder is configured to hold the charge until detection of a match of a voltage of the pixel signal and a voltage of a ramp signal; and
 a coupling transistor configured to turn on and turn off a coupling operation of the first charge holder and the second charge holder; and
a control circuit configured to control the coupling operation of the first charge holder and the second charge holder, when the voltage of the pixel signal matches the voltage of the ramp signal,
 wherein a level of the ramp signal varies based on an elapsed time.

2. The solid-state imaging device according to claim 1, further comprising
a comparator configured to compare the voltage of the pixel signal and the voltage of the ramp signal, wherein
 the control circuit is further configured to:
  set a portion of a charge transfer period as a first sensing period; and
  detect the match of the voltage of the pixel signal and the voltage of the ramp signal, based on a comparison result by the comparator,
 the charge transfer period is a period in which the charge generated by the photoelectric converter is transferred to the first charge holder, and
 the first sensing period is a period in which the match of the voltage of the pixel signal and the voltage of the ramp signal is detected.

3. The solid-state imaging device according to claim 1, further comprising a digital to analog converter (DAC) configured to set the voltage of the ramp signal to a voltage corresponding to a saturation level of the first charge holder.

4. The solid-state imaging device according to claim 3, wherein the DAC is further configured to set, in a first half of a charge transfer period, the voltage of the ramp signal to the voltage corresponding to the saturation level of the first charge holder.

5. The solid-state imaging device according to claim 3, wherein the DAC is further configured to vary the voltage corresponding to the saturation level of the first charge holder based on an operating mode of the solid-state imaging device.

6. The solid-state imaging device according to claim 2, wherein the control circuit is further configured to latch and store a sensing result that indicates the match of the voltage of the pixel signal and the voltage of the ramp signal, based on the detection of the voltage of the pixel signal and the voltage of the ramp signal.

7. The solid-state imaging device according to claim 6, wherein the control circuit is further configured to reset the sensing result, before the charge generated in the photoelectric converter is transferred to the first charge holder.

8. The solid-state imaging device according to claim 6, further comprising a counter, wherein
the control circuit is further configured to output, to the counter, the sensing result, and
the counter is configured to count a time until which the voltage of the pixel signal and the voltage of the ramp signal are matched.

9. The solid-state imaging device according to claim 8, wherein
the counter is further configured to:
 compute pixel data, when the sensing result indicating that the voltage of the pixel signal matches the voltage of the ramp signal is supplied,
 correct the pixel data, based on a gain ratio of the first charge holder and the second charge holder.

10. The solid-state imaging device according to claim 2, wherein
the control circuit is further configured to:
 set a portion of a D phase period as a second sensing period in which the match of the voltage of the pixel signal and the voltage of the ramp signal is detected; and
 control the coupling operation of the first charge holder and the second charge holder when the match of the voltage of the pixel signal and the voltage of the ramp signal is detected.

11. The solid-state imaging device according to claim 10, further comprising a counter configured to:
synthesize first pixel data that uses only the first charge holder;
synthesize second pixel data that is corrected based on a gain ratio of the first charge holder and the second charge holder,
 wherein the synthesis of the first pixel data and the synthesis of the second pixel data are based on the match of the voltage of the pixel signal and the voltage of the ramp signal in the second sensing period; and
compute third pixel data that corresponds to the synthesis of the first pixel data and the synthesis of the second pixel data.

12. The solid-state imaging device according to claim 11, wherein the counter is further configured to:
output the second pixel data that is corrected based on the gain ratio of the first charge holder and the second charge holder, when the match of the voltage of the pixel signal and the voltage of the ramp signal is detected in the first sensing period;
output the third pixel data, when the match of the voltage of the pixel signal and the voltage of the ramp signal is detected in the second sensing period; and
output the first pixel data that uses only the first charge holder, when the match of the voltage of the pixel signal and the voltage of the ramp signal is not detected in one of the first sensing period or the second sensing period.

13. The solid-state imaging device according to claim 1, further comprising a counter configured to:
calculate pixel data, based on a time until which the voltage of the pixel signal outputted from the pixel matches the voltage of the ramp signal;

output, as for the pixel data that uses only the first charge holder, the pixel data that uses only the first charge holder; and output, as for the pixel data that uses both the first charge holder and the second charge holder, corrected pixel data in which the pixel data is corrected based on a gain ratio of the first charge holder and the second charge holder.

14. The solid-state imaging device according to claim 1, further comprising:
    a first reset transistor configured to reset the charge in the first charge holder; and
    a second reset transistor configured to reset the charge in the second charge holder, wherein
        the first charge holder is coupled to a specific reset voltage via the first reset transistor and the second reset transistor.

15. The solid-state imaging device according to claim 1, further comprising:
    a first reset transistor configured to reset the charge in the first charge holder; and
    a second reset transistor configured to reset the charge in the second charge holder, wherein
        the first charge holder is coupled to a specific reset voltage via the first reset transistor.

16. The solid-state imaging device according to claim 1, further comprising a plurality of pixels, wherein
    the plurality of pixels includes the pixel, and
    the plurality of pixels is configured to share the first charge holder, the second charge holder, and the coupling transistor.

17. A method of controlling a solid-state imaging device, comprising:
    controlling, by a control circuit, a coupling operation of a first charge holder and a second charge holder, when a voltage of a pixel signal outputted from a pixel matches a voltage of a ramp signal, wherein
    a level of the ramp signal varies based on an elapsed time, and
    the solid-state imaging device includes:
        the pixel configured to output the pixel signal, wherein the pixel includes:
            a photoelectric converter configured to generate a charge;
            the first charge holder;
            the second charge holder, wherein
                the first charge holder and the second charge holder are configured to hold the charge,
                the first charge holder has a charge capacity smaller than a charge capacity of the second charge holder, and
                the first charge holder is configured to hold the charge until detection of the match of the voltage of the pixel signal and the voltage of the ramp signal; and
            a coupling transistor configured to turn on and turn off the coupling operation of the first charge holder and the second charge holder; and
        the control circuit.

18. An electronic apparatus including a solid-state imaging device, the solid-state imaging device comprising:
    a pixel configured to output a pixel signal, wherein the pixel includes:
        a photoelectric converter configured to generate a charge;
        a first charge holder;
        a second charge holder, wherein
            the first charge holder and the second charge holder are configured to hold the charge generated in the photoelectric converter of the pixel,
            the first charge holder has a charge capacity smaller than a charge capacity of the second charge holder, and
            the first charge holder is configured to hold the charge until detection of a match of a voltage of the pixel signal and a voltage of a ramp signal; and
        a coupling transistor configured to turn on and turn off a coupling operation of the first charge holder and the second charge holder; and
    a control circuit configured to control the coupling operation of the first charge holder and the second charge holder, when the voltage of the pixel signal matches the voltage of the ramp signal,
    wherein a level of the ramp signal varies based on an elapsed time.

* * * * *